US006301340B1

United States Patent
Sansom et al.

(10) Patent No.: US 6,301,340 B1
(45) Date of Patent: *Oct. 9, 2001

(54) MECHANISM FOR PROVIDING EMERGENCY POTS SERVICE IN EVENT OF LOSS OF POWER TO CUSTOMER PREMISES EQUIPMENT FOR ISDN TELEPHONE LINES

(75) Inventors: Michael Scott Sansom; Kevin W. Schneider, both of Huntsville, AL (US)

(73) Assignee: Adtran, Inc., Huntsville, AL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/378,530

(22) Filed: Aug. 20, 1999

Related U.S. Application Data

(63) Continuation of application No. 08/500,189, filed on Jul. 10, 1995, now Pat. No. 5,943,404.

(51) Int. Cl.[7] .................................................. H04M 11/00
(52) U.S. Cl. .................................... 379/93.06; 379/93.09; 379/27
(58) Field of Search ............................. 379/93.06, 93.05, 379/93.14, 93.09, 399, 413, 2, 27; 370/216, 217, 242, 248

(56) References Cited

U.S. PATENT DOCUMENTS

| 4,853,949 | * | 8/1989 | Schorr et al. | 379/93.14 |
| 5,142,571 | * | 8/1992 | Suzuki et al. | 379/279 |
| 5,216,704 | * | 6/1993 | Williams et al. | 379/93.14 |
| 5,610,922 | * | 3/1997 | Balatoni | 370/468 |
| 5,619,252 | * | 4/1997 | Nakano | 379/93.17 |
| 5,627,827 | * | 5/1997 | Dale et al. | 370/359 |
| 5,943,404 | * | 8/1999 | Sansom et al. | 379/93.06 |

* cited by examiner

Primary Examiner—Stella Woo
(74) Attorney, Agent, or Firm—Allen, Dyer, Doppelt, Milbrath & Gilchrist, P.A.

(57) ABSTRACT

In order to ensure continuous telephone service to a customer premises served by an ISDN line, without requiring that the customer maintain an additional POTS line as an emergency back-up to the normally used ISDN service, ISDN signalling circuits and network termination interface components are modified, so that, in the event of a loss of power to customer premises digital communications equipment, a communication link between an auxiliary POTS telephone and the normal ISDN communication path to the central office may be established. There need not be any modification of the central office switch, per se, so that the integrity of the ISDN communication path with the central office line card remains unaffected. As a result, the central office equipment can continue to conduct standard ISDN communications with the customer premises equipment, even though the customer is employing a POTS back-up analog phone.

19 Claims, 11 Drawing Sheets

MECHANISM FOR PROVIDING EMERGENCY POTS SERVICE IN EVENT OF LOSS OF POWER TO CUSTOMER PREMISES EQUIPMENT FOR ISDN TELEPHONE LINES

This is a continuation of application Ser. No. 08/500,189, filed Jul. 10, 1995, now U.S. Pat. No. 5,943,404.

FIELD OF THE INVENTION

The present invention relates in general to telephone systems and networks, and is particularly directed to a new and improved mechanism that is connectable with and may be integrated within transceiver card and network termination interface components of an integrated services digital network telephone system, for providing auxiliary, substitute telephone service capability (plain old telephone service or POTS) between an auxiliary analog telephone installed at a customer premises site and an integrated services digital network communication path (either extended or non-extended) to a line card of a central office switch, in the event of a power outage at the customer premises.

BACKGROUND OF THE INVENTION

Integrated services digital network (ISDN) communication systems enable telephone service providers to supply multiple types of signalling channels from a central office over a signal local loop twisted pair to a network termination interface at a customer premises site. FIG. 1 diagrammatically illustrates a reduced complexity example of a typical extended distance ISDN communication system, while FIG. 2 diagrammatically illustrates a non-extended distance ISDN communication system. The extended distance ISDN system of FIG. 1 is intended to enable a telephone service provider to supply multiple types of signalling channels from a central office (CO) site 10 over a PCM link (such as an optical fiber link) to a remotely located customer premises equipment (CPE) site 20, while the non-extended network of FIG. 2 provides a local loop directly from the central office to the customer premises site. ISDN signalling channels typically include digital data channels and/or digitized voice channels, as well as a separate administrative channel that conveys call control information.

More particularly, in the extended distance system of FIG. 1, the central office site 10, which is located at a 'west' end of an extended (PCM) communication link 30, includes a central office switch 11 (such as a 5ESS switch manufactured by AT&T), which contains a plurality of line termination circuits (or line cards), one of which is shown at 12. For extended distance communications carried out by the system of FIG. 1, line card 12 is coupled over a local loop (twisted tip/ring pair) 13 to what is termed in the telephone industry as a U Basic Rate-One Transmission Extension (U-BR1TE) transceiver card 14 (also known in the industry as a Basic Rate Interface Transmission Extension (U-BRITE) card).

The U-BR1TE (or U-BRITE) card contains an ISDN transceiver unit and an associated PCM bus interface which are operative to transmit and receive standard 2B+D ISDN data traffic over a PCM digital data link, such as a T1=1.544 MB/s link, and to interface the ISDN signals via the local loop to and from loop termination equipment. Namely, the U-BR1TE card 14 interfaces the local loop 13 with a digital data link 30 for PCM communications transport to another U-BR1TE transceiver card 24 at the east end of the link 30, serving the customer premises equipment (CPE) site 20. The U-BR1TE transceiver card 24 is, in turn, coupled over a local loop (twisted tip/ring pair) 23 to a network termination interface (NT-1) circuit 21, to which customer premises equipment, such as an ISDN data terminal, shown at 22, is coupled. In the non-extended system configuration of FIG. 2, the local loop 13 from a respective line card 12 in the central office switch 11, rather than being coupled to a U-BR1TE transceiver card, is coupled directly to the network termination interface (NT-1) circuit 21.

In either system configuration, since the network termination interface 21 is customer-installed (and therefore locally powered at the customer premises site 20, rather than being powered by the central office 10, as in the case of a conventional POTS telephone), the local telephone service provider is unable to interfere with the customer's choice of equipment to be connected to the ISDN line, such as the installation of equipment that provides a battery back-up in the event of a power outage.

Although the public service commissions of local jurisdictions where customer premises equipment is installed require that telephone service providers (regional Bell operating companies) ensure that each customer be provided with emergency (911) telephone service, the service provider is currently not permitted to dictate that the customer install a particular piece of equipment, such as one that will provide back-up battery for the network termination interface during a power outage. As a consequence, service providers customarily require their residential customers to maintain a separate POTS line as an emergency adjunct to the ISDN service, so that the residential customer is, in effect, forced to subscribe to an additional form of 'fire insurance'. Namely, the extra POTS line is intended to prevent residential customers from losing access to telephone service, particularly in the event of an emergency, where expedient 911 service may be critical. Such a requirement obviously constitutes a substantial cost penalty to the customer, who is faced with both a potential installation fee, and an unwanted monthly bill for a normally unused POTS line.

SUMMARY OF THE INVENTION

In accordance with the present invention, the need to ensure continuous telephone service to a residential customer premises served by an ISDN line, without requiring that the customer maintain an additional POTS line as an emergency back-up to the normally used ISDN service, is successfully addressed by a modification of conventional ISDN signalling circuits and network termination interface components, together with an augmentation of the communication control software employed therein, so that, in the event of a loss of power to customer premises equipment, a communication link between an auxiliary POTS telephone and an ISDN communication path to the central office may be established.

In accordance with a first embodiment of the invention, the U-BR1TE card of an extended distance ISDN system, and network termination interface at the customer premises site are respectively replaced with a modified U-BR1TE card and a modified network termination interface, which selectively provide auxiliary communication capability over the extended ISDN line with an auxiliary POTS telephone, that is connectable to the modified network termination interface. Advantageously, in this and other embodiments of the invention, there is no modification of the central office switch, per se, so that the integrity of the ISDN communication path with the central office line card remains unaffected. As a result, the central office equipment can continue to conduct standard ISDN communications with the customer premises equipment, even though the customer is employing a POTS back-up phone.

Pursuant to the first embodiment of the invention, the architecture of the U-BR1TE card is modified to include an auxiliary digital/analog interface, an auxiliary loop relay, and a loss of power monitoring mechanism which is associated with the card's microcontroller. In the event of an emergency POTS mode of operation, the microcontroller operates the loop relay and thereby substitutes the auxiliary digital/analog interface in place of normally employed ISDN transceiver circuitry. Respective transmit and receive links of a PCM bus are terminated by way of a standard PCM bus interface unit which is controlled by the microcontroller and is also coupled to an ISDN U-transceiver interface. The ISDN U-transceiver interface customarily directly ports industry standard 2B1Q-formatted symbols with respective tip and ring leads of a local twisted cable pair loop that services the customer premises equipment.

The auxiliary digital/analog interface contains a codec unit and a subscriber loop interface (SLI), which are controllably connected in circuit between the local loop and the PCM bus interface in dependence upon the state of operation of the auxiliary loop relay. The SLI, which performs on-hook/off-hook detection, is coupled to each of a (10 KHz) tone detector and a dual tone multifrequency (DTMF) and pulse detector, outputs of which are coupled to the microcontroller. The tone detector is employed as a wake-up tone detector and supplies an output signal to the microcontroller, in response to the network termination interface at the customer premises generating a 10 KHZ tone upon power-up. The DTMF detector produces signals associated with tone signals (such as dial tones) sourced from the customer premises equipment.

The control software of microcontroller contains a loss of power monitoring mechanism, which monitors the signalling condition on the tip and ring pair of the local loop by looking for a signalling condition representative of loss of power to the network termination interface. This loss of power condition may be detected, by examining data received at the U-transceiver interface for status information bits associated with the power status of the network termination interface, or may be identified by a loss in synchronization of the data received by the U-transceiver interface from the local loop. To accommodate a very brief loss of power, such as a momentary interruption caused by a lightning strike, without switching to the back-up mode, a filter mechanism is employed, which requires that the power loss persist for a minimum duration. In response to detecting such a loss of power condition, the microcontroller operates the auxiliary relay, thereby causing the local loop to be decoupled from the path for normal ISDN signal processing in the U-transceiver interface and, instead, couples the local loop through the digital/analog interface to the PCM bus interface.

When placed in this auxiliary or emergency back-up POTS mode, control signals (either pulse or tone dialing signals) supplied over the local loop from the customer's POTS phone are output as standard (Q921/931) messages over the ISDN D channel from the microcontroller to the PCM bus interface. The auxiliary digital/analog interface converts sampled analog voice signals received over the local loop from the auxiliary POTS telephone into digital communication signals, such as 64 Kbps digitally formatted voice signals, that are coupled to the PCM bus interface for transmission via a B channel portion of the ISDN communication link of an outgoing data stream to the central office. Conversely, in the receive direction, received digital signals from the PCM bus interface are coupled to the auxiliary digital/analog interface, which regenerates outgoing analog voice signals for application through the auxiliary relay to the local loop.

When power has been restored to the customer premises equipment, where the functionality of the circuitry within the network termination interface is designed to generate a 10 KHz tone on power-up, a signal from the 10 KHz tone detector causes the microcontroller to check for an ON-HOOK condition on the loop, indicating that the POTS phone is not in use. If the POTS phone is OFF-HOOK, the call is allowed to be completed. Upon verifying an ON-HOOK condition of the POTS phone, the microcontroller deactivates the auxiliary relay, thereby decoupling the local loop from the auxiliary digital/analog interface, and recoupling the local loop to the normal ISDN signal processing circuitry within the digital communication signal U-transceiver interface.

Where the network termination interface is of the type that does not transmit such a 10 KHz tone on power-up, the monitoring mechanism within microcontroller may periodically deactivate the auxiliary relay when in an on-hook state, and thereby periodically decouple the auxiliary digital/analog interface from the local loop, and then recouple the local loop to the ISDN U-transceiver interface. During each of these periodic change-overs, the transceiver attempts to reestablish digital communication capability over the local loop with the network termination interface. If it is unable to do so within a prescribed period of time, the microcontroller again switches the relay back to the POTS mode configuration, and thereby returns the connection between the local loop and the auxiliary digital/analog interface, so as to decouple the local loop from the ISDN transceiver.

The modified network termination interface includes an auxiliary POTS signalling path and an associated loss of power-responsive relay. In response to a loss of power, the auxiliary relay substitutes the auxiliary signalling path to a POTS phone in place of a normally employed ISDN signalling path to ISDN telephone equipment, so that the POTS phone is connected to the modified U-BR1TE card.

In accordance with a second embodiment of the invention, the U-BR1TE card of an extended distance system is replaced with a modified U-BR1TE card and a smart jack is inserted between the modified U-BR1TE card and the network termination interface. The smart jack is operative to connect the local loop from the modified U-BR1TE card to the RJ45 jack of a conventional network termination interface provides separate RJ11 and RJ45 connections to the auxiliary POTS phone and to the ISDN terminal equipment. An auxiliary relay in the smart jack operates in the same manner as the auxiliary relay in the modified network termination interface architecture, switchably providing an ISDN connection channel for tip/ring and power between a first RJ45 jack and a second RJ45 jack for normal ISDN mode of operation, and an auxiliary path between tip/ring leads of the first RJ45 jack to an RJ11 jack during POTS mode of operation.

Pursuant to a third embodiment of the invention for extended distance ISDN communications, the U-BR1TE card and the network termination interface at the customer premises site are respectively replaced with a modified U-BR1TE card and an integrated ISDN telephone and network termination interface unit, which includes a POTS phone back-up. The integrated ISDN telephone and network termination interface unit comprises a tip/ring interface ported to the local twisted cable pair loop from the modified U-BR1TE card, and a loss of power sensing relay.

In its normal powered condition, the relay is operative to provide a path through which a U-transceiver interface, codec and the SLI are controllably connected in circuit to the local loop and a hand set interface. As a result, the customer is able to conduct standard ISDN voice communications with the network in a conventional manner. The ISDN U-transceiver interface is controlled by a communications control microcontroller.

In response to a loss of local power, the relay is de-energized, so that power is supplied through a POTS line hybrid interface, whereby internal loop power may be drawn from the local loop. This internal loop power is coupled to the hand set interface, so as to support a back-up analog voice channel to the POTS line hybrid interface from the hand set. As a consequence the customer has a POTS analog link through the hybrid to the local loop and the modified U-BR1TE card. When power is restored, the relay winding is again energized, so as to provide a circuit path between the local loop and the ISDN U-transceiver interface.

In accordance with a fourth embodiment of the invention, the modified network termination interface of the extended distance system is replaced by an integrated ISDN terminal adapter and network termination interface having a single jack/port, which is operative either as an ISDN voice channel or as an emergency POTS back-up. This integrated ISDN terminal adapter and network termination interface is similar to the modified network termination interface, as it contains a normal ISDN signalling path to which a POTS phone is coupled, and an associated loss of power-responsive relay switch, which by-passes the ISDN signalling path and substitutes an auxiliary analog POTS phone back-up path in place of the normally employed ISDN signalling path. As a consequence, the POTS phone may be connected directly via the local loop to the modified UBR1TE card associated with the customer premises site.

The integrated ISDN terminal adapter and network termination interface includes a relay having a winding connected to the local power source supplied by the customer, and a first pair of switch contacts connected in circuit with the tip and ring leads of the local loop and first and second alternative tip and ring pairs. The first tip and ring pair is coupled to provide a path for the normal 2B1Q ISDN signalling channel with an ISDN transceiver unit. This ISDN transceiver unit is coupled to an attendant control processor, which is ported to local digital data terminal equipment, which may be ISDN telephone or other ISDN terminal equipment. The other tip and ring pair is coupled to a second pair of switch contacts of the relay switch, which are ported via a tip and ring pair to the POTS jack/port. A further tip and ring pair is coupled via relay switch contacts to an SLI/codec unit interfaced with the processor.

With local power being normally applied to the integrated ISDN terminal adapter and network termination interface, the relay winding is energized, so that a first pair of switchable contacts of the relay switch provide a circuit path between the tip and ring leads of the local loop to the U-transceiver interface. A second pair of switchable contacts of the relay switch provide a circuit path between the tip and ring leads of the POTS phone and the SLI/codec unit. In this normal mode of operation, the POTS phone is interfaced with the ISDN interface circuit functionality of the codec, SLI and transceiver components of the interface, so that it effectively appears to the modified U-BR1TE card as a piece of ISDN data terminal equipment. Should there be a loss of local power, the ISDN signal processing circuitry within the modified network termination interface will become disabled, preventing the use of the POTS phone for normal ISDN communications. In this event, the relay winding is de-energized, causing the local loop 240 to be connected directly to the POTS phone, by-passing the ISDN signal processing circuitry of the interface.

In addition to providing back-up emergency POTS service for extended distance ISDN applications, the present invention may also be employed to provide power outage back-up POTS service for a non-extended distance ISDN communication system, in which the local loop from a respective line card in the central office switch is coupled directly to the network termination interface (NT1) circuit, rather than to a U-BR1TE transceiver card for effecting extended distance communications via a PCM link.

Pursuant to a fifth embodiment of the present invention, loss of power POTS back-up service is provided to a non-extended distance ISDN communication system, wherein the network termination interface is replaced by the modified network termination interface. As in the above-described embodiments of the invention for extended distance applications, the integrity of the ISDN communication path between the network termination interface and the central office switch remains unaffected, so that the central office equipment continues to conduct standard ISDN communications with the customer premises equipment, even though the customer is again employing a POTS back-up phone.

In the fifth embodiment, since the modified network termination interface causes the analog signals of the POTS phone to be applied through signal path directly to the local loop for transport to the line card of the central office switch, it its necessary to replace the line card with a modified line card, which is configured to replicate the modified U-BR1TE card configuration, described above.

In accordance with a sixth embodiment of the invention, for non-extended distance ISDN communications, the network termination interface at the customer premises site is replaced with a integrated ISDN telephone and network termination interface unit which includes a POTS phone back-up, described above. In this embodiment, as in the fifth embodiment, since the integrated ISDN telephone and network termination interface unit also causes the analog signals of the POTS phone to be applied to the local loop for transport to the line card of the central office switch, it its necessary to replace the line card with a modified line card, which is configured to replicate the modified U-BR1TE card configuration, described above.

Pursuant to a seventh embodiment of the present invention, the modified network termination interface of the non-extended distance system is replaced by the integrated ISDN terminal adapter and network termination interface. In addition, since the integrated ISDN terminal adapter and network termination interface interfaces the POTS phone's analog signals with the local loop to the line card of the central office switch, it is again necessary to replace the line card with a modified line card that is configured to replicate the modified U-BR1TE card, as described above.

In an eighth embodiment, for non-extended ISDN applications, similar to the second embodiment for extended ISDN applications, rather than employ the modified network termination interface to provide the auxiliary POTS signalling path and an associated loss of power-responsive relay switch, these auxiliary channel-connectivity functions are provided through separate smart jack module. This smart jack module connects the local loop from a modified line card in the central office switch to the RJ45 jack of a conventional network termination interface and is operative to provide separate RJ11 and RJ45 connections to the auxiliary POTS phone and to the ISDN terminal equipment.

In accordance with a ninth embodiment of the present invention, a smart jack module is also used to connect the local loop to an RJ45 jack of a conventional network termination interface and is operative to provide separate RJ11 and RJ45 connections to the auxiliary POTS phone and to the ISDN terminal equipment. However, rather than replace the line card in the central office switch with a modified line card, an ISDN POTS back-up interface is installed in the local loop.

The ISDN POTS back-up interface is configured similar to the modified U-BR1TE card. Respective tip and ring leads of the network side of the local loop are terminated by way of a network termination U transceiver interface, which interfaces 2B1Q data with the network side of local loop. The network termination U transceiver interface is controlled by a microcontroller and is also coupled via a first ISDN bus to a data router unit. The data router is coupled via a second ISDN bus to a loop termination U-transceiver interface, which interfaces 2B1Q data with the customer premises side of local loop. The data router either transparently and bidirectionally routes 2B+D data between the network and loop transceivers, or routes 1B+D data between the network U-transceiver and a codec within the auxiliary digital/analog interface, during POTS back-up mode. The microcontroller is coupled to the loop termination U-transceiver and to the data router. D channel data is coupled between the microcontroller and the data router.

Like the modified U-BR1TE card, the auxiliary digital/analog interface of the ISDN POTS back-up interface also includes a codec and an SLI, which are controllably connected in circuit between a data bus to the data router and tip and ring leads to first terminal contacts of the relay. The loop termination U-transceiver interface is coupled via respective tip and ring leads to second terminal contacts of the relay. A pair of switchable relay arms are coupled to respective tip and ring leads of the customer premises side of the interface. The SLI is also coupled to each of a 10 KHz tone detector and a dual tone multifrequency (DTMF) and pulse detector respective outputs of which are coupled to the microcontroller. The 10 KHz tone detector is employed as a wake-up tone detector and supplies an output signal to the microcontroller in response to the network termination interface at the customer premises generating a 10 KHz tone upon power-up. The DTMF detector produces signals associated with tone signals sourced from the customer premises equipment.

As in the modified U-BR1TE card described previously, the control software employed by the microcontroller monitors the local loop leads to the network termination interface, in order to determine the ability of the network termination interface to provide normal telephone service with the customer's data terminal equipment (DTE). In response to detecting a loss of power condition, the microcontroller operates the relay, so that the tip and ring leads of the customer premises side of the local loop are decoupled from the tip and ring path for normal ISDN signal processing to the loop termination U-transceiver unit and, instead, couples the local loop leads to the digital/analog interface.

When placed in this POTS back-up mode, control signals from the customer's POTS phone are translated into standard (Q921/931) messages over D channel link to the data router for application to the D channel and transmission on the network side of the local loop by way of the network termination U-transceiver interface. The digital/analog interface converts sampled analog voice signals received from the POTS telephone into 64 Kbps digitally formatted voice signals, that are coupled over ISDN bus to the data router for application via a B channel portion of the ISDN communication bus of the U-transceiver interface and transmission therefrom as 2B1Q data over the network side of the local loop to the line card in the central office.

In the receive direction from the network side of the local loop, incoming 2B1Q signals from the line card are converted by the network U-transceiver into 2B+D signals and applied via a ISDN bus to the data router. The data router couples the bearer (B) channel (coded voice) data from the network U-transceiver interface to the auxiliary digital/analog interface, which regenerates outgoing analog voice signals through the relay to the tip and ring leads of the customer premises side of the local loop.

Similar to the operation of the modified U-BR1TE card described above, in response to power being restored to the customer premises equipment, where the network termination interface is designed to generate a 10 KHz tone on power-up, a signal is coupled the 10 KHz tone detector to the microcontroller, indicating that the POTS phone is not in use. If the POTS phone is not in use, the microcontroller deactivates the relay, thereby decoupling the customer premises side of the local loop from the auxiliary digital/analog interface, and recoupling the loop to the loop termination U-transceiver interface.

As in the modified U-BR1TE card, where the network termination interface is of the type that does not transmit a 10 KHz tone on power-up, the microcontroller may periodically deactivate the relay and thereby repeatedly decouple the auxiliary digital/analog interface from the local loop, and then recouple the local loop to the loop termination U-transceiver interface, which attempts to reestablish digital communication capability over the local loop with the network termination interface, as described above.

In accordance with a tenth embodiment of the invention, similar to the extended distance system architecture of the third embodiment, the network termination interface at the customer premises site is replaced with the integrated ISDN telephone and network termination interface unit, which includes a POTS phone back-up. As in the ninth embodiment,in order to accommodate the analog signalling format of the POTS phone, rather than replace the line card in the central office switch with a modified line card, the ISDN POTS back-up interface is installed in the local loop.

Pursuant to an eleventh embodiment of the invention, the modified network termination interface of the non-extended distance system is replaced by an integrated ISDN terminal adapter and network termination interface, described above. In addition, as in the ninth and tenth embodiments, in order to accommodate the analog signalling format of the POTS phone, rather than replace the line card in the central office switch with a modified line card, the ISDN POTS back-up interface is installed in the local loop between the line card and the integrated ISDN terminal adapter and network termination interface.

Pursuant to a twelfth embodiment of the present invention, the network termination interface of the non-extended distance system is replaced by the modified network termination interface. Also, as in the ninth through eleventh embodiments, in order to maintain integrity of the ISDN communication path between the network termination interface and the central office switch, rather than replace the line card in the central office switch with a modified line card, the ISDN POTS back-up interface is installed in the local loop between the line card and the integrated ISDN terminal adapter and network termination interface.

Pursuant to a thirteenth embodiment of the invention, the eleventh embodiment is modified so that the integrated ISDN terminal adapter and network termination interface is replaced by a modified configuration to provide for connection to an ISDN S/T interface port. Rather than having a connection for customer interface data to data terminal equipment, the control processor is coupled to an S/T interface which interfaces a 2B+D channel with a U-interface and is coupled to via an S/T port to an ISDN terminal equipment, terminal adapter. The D channel is coupled between the processor and the U-interface, while the B channel is coupled between the U-interface and the SLI and codec.

DETAILED DESCRIPTION

Figure 1:
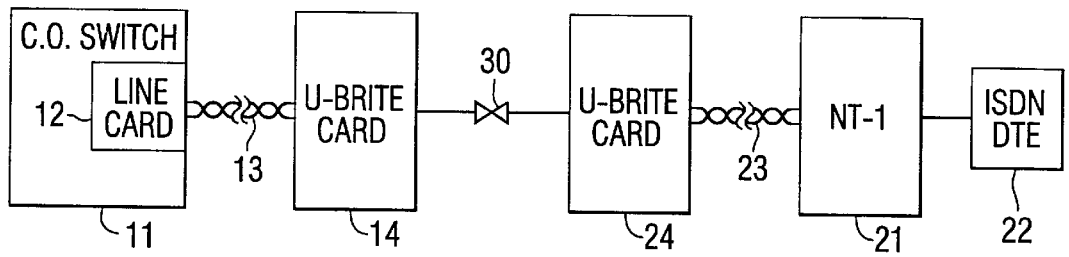
FIG. 1 diagrammatically illustrates a reduced complexity example of a typical extended distance integrated services digital network (ISDN) communication system.

Before describing in detail the new and improved mechanism for providing auxiliary, substitute POTS capability at an ISDN customer premises, it should be observed that the present invention resides primarily in the modification of conventional ISDN signalling circuits and network termination interface components, together with an augmentation of the communication control software employed therein, that enables ISDN signalling capability monitoring mechanisms in each of the central office and customer premises equipments sites to selectively decouple the local loop from the normal ISDN signal processing circuitry in the digital communication signal transceiver and the ISDN customer premises equipment and, in their place, switch the local loop to an auxiliary digital/analog interface and a back-up POTS telephone, so as to install an operative communication link between the POTS telephone and the ISDN communication path to the central office. The details of the circuitry of the ISDN transceiver and network termination interface units are otherwise essentially unaffected.

Accordingly, the structure, control and arrangement of these conventional circuits and components have been illustrated in the drawings by readily understandable block diagrams which show only those specific details that are pertinent to the present invention, so as not to obscure the disclosure with structural details which will be readily apparent to those skilled in the art having the benefit of the description herein. Thus, the block diagram illustrations of the Figures do not necessarily represent the mechanical structural arrangement of the exemplary system, but are primarily intended to illustrate the major structural components of the system in a convenient functional grouping, whereby the present invention may be more readily understood.

As pointed out previously, because the network termination interface 21 (whether it be installed in the extended distance system of FIG. 1 or the non-extended distance system of FIG. 2) is a customer-installed piece of equipment, it is locally powered, and may not have a battery back-up, so that there is no assurance that the customer will have telephone service capability in the event of a power outage at the customer premises site. Since the telephone service provider is not allowed to compel the customer to install equipment that possesses back-up battery, then, in order to ensure emergency telephone communication capability, the service provider customarily requires that a residential customer maintain a separate POTS line as an adjunct to the ISDN line.

Figure 3:
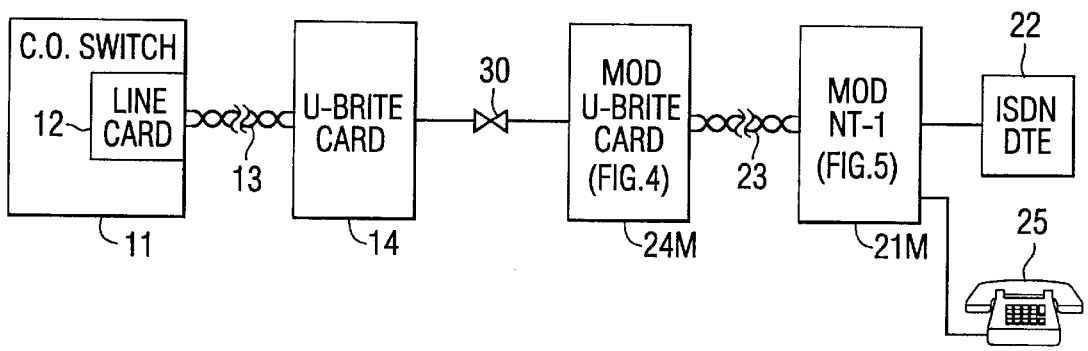
FIG. 3 diagrammatically illustrates the manner in which a U-BR1TE card of the extended distance ISDN communication system of FIG. 1 may be upgraded in accordance with a first embodiment of the invention, to selectively substitute an auxiliary digital/analog interface in place of the normally employed ISDN signalling circuitry, for emergency (loss of power) POTS mode of operation.
Figure 4:
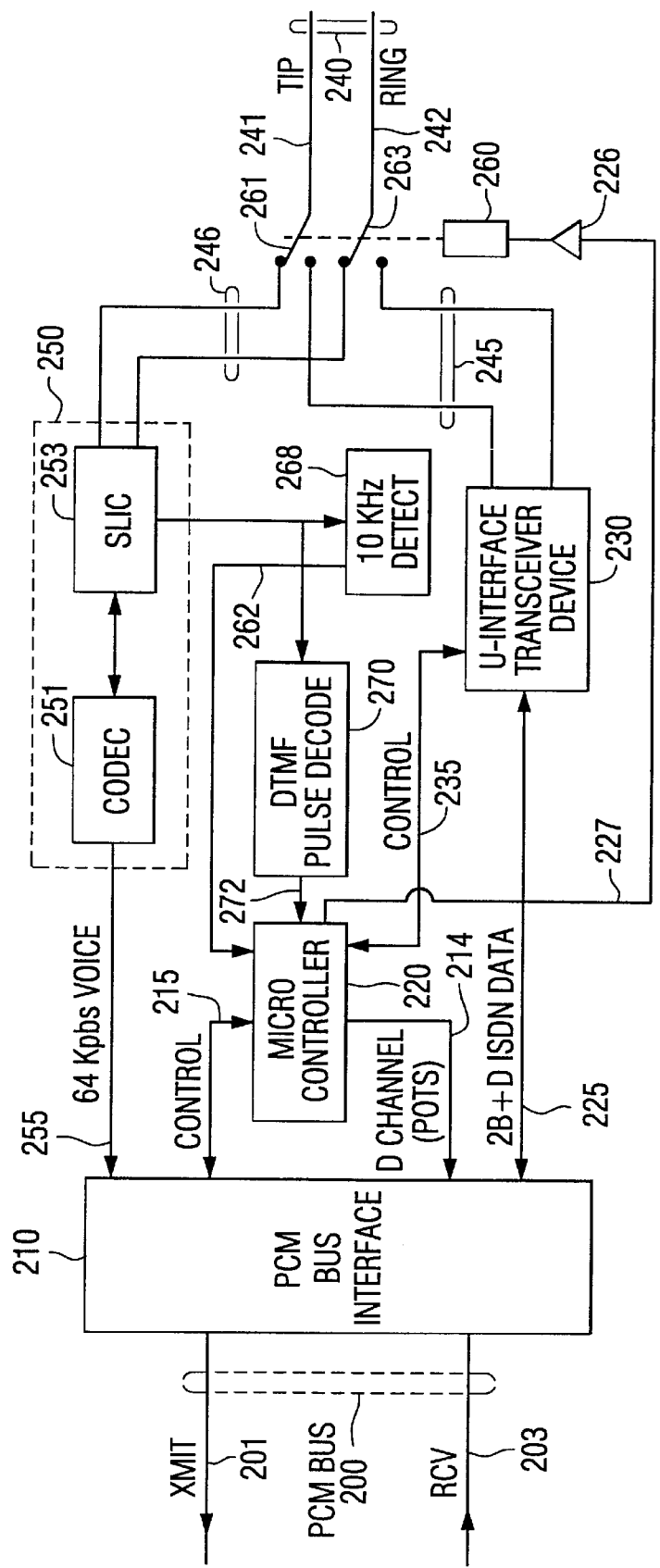
FIG. 4 diagrammatically illustrates the architecture of a modified U-BR1TE card which interfaces the customer premises end of a PCM link with a modified network termination interface.
Figure 5:
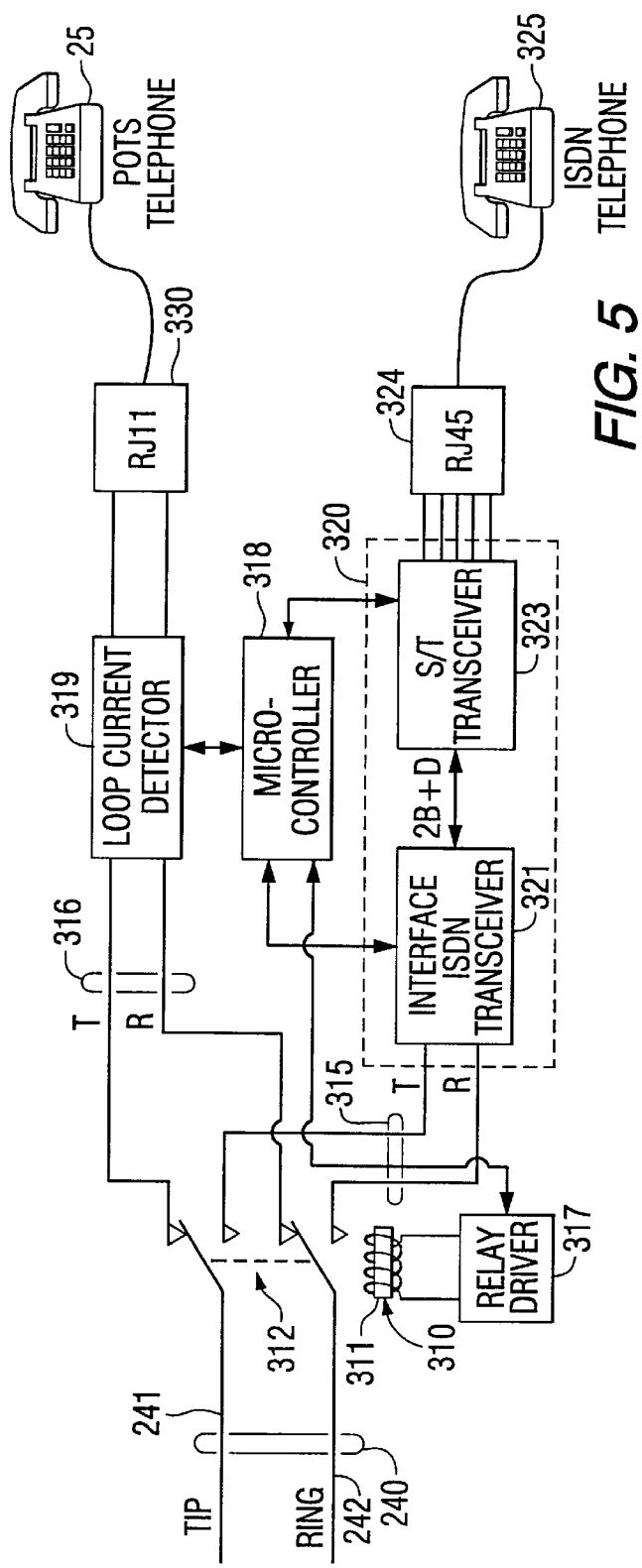
FIG. 5 diagrammatically illustrates the architecture of a modified network termination interface.

Pots Back-up for Extended Distance ISDN Communications Embodiment 1 Modifed U-BR1TE Card, Modified NT-1 Interface FIGS. 3, 4 and 5

Pursuant to a first embodiment of the invention, diagrammatically illustrated in FIG. 3, for extended distance ISDN communications, this problem is successfully obviated by replacing the U-BR1TE card 24 and network termination interface 21 at the customer premises site with a modified U-BR1TE card 24M (shown in detail in FIG. 4, to be described) and a modified network termination interface (NT-1) 21M (shown in detail in FIG. 4, to be described). As will be described, these upgraded units 24M and 24M selectively provide auxiliary communication capability over the extended ISDN line with an auxiliary POTS telephone 25 that is connectable by the customer to the modified network termination interface 21M. In accordance with this first embodiment of the invention, the integrity of the ISDN communication path with the central office line card remains unaffected, there being no modification of central office equipment, so that the central office equipment continues to conduct standard ISDN communications with the customer premises equipment, even though the customer is employing a POTS back-up phone.

More particularly, FIG. 4 diagrammatically illustrates the architecture of a modified U-BR1TE card 24M, which interfaces the customer premises end of the PCM link 30 with a modified NT-1 21M, as including an auxiliary digital/ analog interface 250, a loop relay 260 and, associated with the card's microcontroller 220, a loss of power monitoring mechanism, which, in the event of an emergency POTS mode of operation, is operative to selectively control the operation of the loop relay 260, and thereby control the substitution of the auxiliary digital/analog interface 250 in place of the normally employed ISDN transceiver circuitry.

For this purpose, in the modified U-BR1TE card architecture of FIG. 4, respective transmit and receive links 201 and 203 of the T1 PCM bus 30 are terminated by way of a standard PCM bus interface unit 210. PCM bus interface 210 is controlled by an attendant microcontroller 220 via a control link 215, and is also coupled via an ISDN bus 225 to an ISDN transceiver unit 230. Microcontroller 220 is coupled to ISDN transceiver unit 230 via a control link 235. ISDN bus 225 conveys a standard pair of (64 kb/s) bearer (B) channels and a single (16 kb/s) data (D) channel as (2B+D) data traffic. ISDN transceiver unit 230 customarily directly ports industry standard 2B1Q-formatted symbols with respective tip and ring leads 241 and 242 of a local twisted cable pair loop 240, that services the customer premises equipment.

The modified U-BR1TE card architecture of FIG. 4 further includes an auxiliary digital/analog interface 250, which contains a codec unit 251 and a subscriber loop interface (SLI) 253. The codec and the SLI are controllably connected in circuit between the local loop 240 and the PCM bus interface 210, based upon the state of operation of an auxiliary loop relay 260. The auxiliary loop relay 260 is connected in circuit with the tip and ring leads 241 and 242 of the local loop 240 to the network interface, and first and second alternative tip and ring pairs 245 and 246.

Tip and ring pair 245 is coupled to provide the standard 2B1Q ISDN signalling channel with the transceiver unit 230, while tip and ring pair 246 is coupled to provide an auxiliary POTS signalling channel from a customer's back-up analog POTS phone 25 with auxiliary digital/analog interface 250. The switch contacts 261, 263 of relay 260 are normally coupled to provide a circuit path between the tip and ring leads of the local loop and the tip and ring pair 245 of transceiver unit 230. In the event of a loss of power at the network termination, relay 260 is operated by a relay driver 226, which is coupled over link 227 from microcontroller 220, so as to switch the local loop 240 in circuit with tip and ring pair 246, as will be described.

The subscriber loop interface (SLI) 253 is also coupled to each of a 10 KHz tone detector 268 and a dual tone multifrequency (DTMF) and pulse detector 270, outputs 262 and 272 of which are coupled to microcontroller 210. 10 KHz tone detector 268 is employed as a wake-up tone detector and supplies an output signal over line 262 to the microcontroller 210, in response to the network termination interface at the customer premises generating a 10 KHZ tone upon power-up. DTMF detector 270 produces signals on line 272 associated with tone signals (such as dial tones) sourced from the customer premises equipment 22.

As noted previously, the control software employed by microcontroller 220 is modified in accordance with the invention to continuously monitor the local loop 240 to the network termination interface 21, in order to determine the ability of the network termination interface to provide normal telephone service with the customer's data terminal equipment (DTE) 22. In particular, the control software of microcontroller 220 contains a loss of power monitoring mechanism, which monitors the signalling condition on the tip and ring pair 245 via transceiver unit 230, by looking for a signalling condition representative of loss of power to the network termination interface. This loss of power condition may be detected, for example, by examining data received at the transceiver 230 from the local loop 240 for status information bits associated with the power status of the network termination interface. The loss of power condition may also be identified by a loss in synchronization of the data received by transceiver 230 from the local loop 240.

Regardless of the mechanism employed, in response to detecting a loss of power condition, the microcontroller 220 generates a switch control output signal on line 227 to relay driver 226, so as to operate relay 260 and thereby cause the tip and ring leads 241 and 242 of the local loop 240 to be decoupled from the tip and ring path 245 for normal ISDN signal processing in transceiver unit 230 and, instead, couple the local loop 240 through the auxiliary tip and ring pair 246 to digital/analog interface 250 to the PCM bus interface 210.

When placed in this 'auxiliary POTS' mode, control signals (pulse or tone dialing signals) from the customer's POTS phone via the local loop 240 are output as standard (Q921/931) messages over D channel link 214 from microcontroller 220 to the PCM bus interface 210. The auxiliary digital/analog interface 250 is operative to convert sampled analog voice signals received over the local loop 240 from the auxiliary analog (POTS) telephone 25 into digital communication signals, such as 64 Kbps digitally formatted voice signals, that are coupled over link 255 to the PCM bus interface 210 for transmission via a B channel portion of the ISDN communication link of an outgoing T1 data stream over transmit bus 201. In the receive direction from receive bus 203, received T1 signals are coupled over link 255 from the PCM bus interface 210 to the auxiliary digital/analog interface 250, which regenerates outgoing analog voice signals for application over tip/ring pair 246 through relay 260 to the local loop 240.

When power has been restored to the customer premises equipment (corresponding to a signalling recovery condition), if the functionality of the circuitry within the network termination interface is designed to generate a 10 KHZ tone on power-up, a signal is coupled over line 262 from 10 KHz tone detector 268 to microcontroller 220, indicating that the POTS phone 25 is not in use (OFF-HOOK). (If the POTS phone 25 is currently OFF-HOOK, the call is allowed to be completed.) Microcontroller 220 then deactivates relay 260, thereby decoupling the local loop 250 from the auxiliary digital/analog interface 250, and recoupling the local loop 250 to the normal ISDN signal processing circuitry within the digital communication signal transceiver unit 230.

Where the network termination interface is of the type that does not transmit such a 10 KHz tone on power-up, the monitoring mechanism within microcontroller 220 may periodically deactivate relay 260 and thereby periodically decouple the auxiliary digital/analog interface 250 from the local loop 240, and then recouple the local loop to the ISDN transceiver 230. During each of these periodic change-overs, transceiver 230 attempts to reestablish digital communication capability over the local loop 240 with the network termination interface 21. If it is unable to do so within a prescribed period of time (e.g. five seconds), the microcontroller 220 again switches the relay 260 back to the POTS mode configuration, and thereby returns the connection between the local loop 240 and the auxiliary digital/analog interface 250, so as to decouple the local loop from the ISDN transceiver 230.

FIG. 5 diagrammatically illustrates the architecture of a modified network termination interface 21M as including an auxiliary POTS signalling path 290 and an associated loss of power-responsive relay switch 310. As will be described, upon loss of power, the auxiliary relay switch 310 substitutes the auxiliary signalling path 290 to a POTS phone 25, in place of a normally employed ISDN signalling path to ISDN telephone equipment 325, so that the POTS phone 25 is connected to the modified U-BR1TE card 24M of FIG. 4, described above.

More particularly, the modified network termination interface 21M of FIG. 5 includes a relay switch 310, having a winding 311 connected to a relay (winding) driver 317, which is controlled by an attendant control processor 318. Relay switch contacts 312 are connected in circuit with the tip and ring leads 241 and 242 of the local loop 240, and first and second alternative tip and ring pairs 315 and 316. A loop current detector (such as an optoisolator circuit) 319 is coupled in one of the tip and ring links of tip/ring pair 316, and has its output coupled to control processor 318.

Tip and ring pair 315 is coupled to provide a path for the normal 2B1Q ISDN signalling channel with an ISDN transceiver unit, shown in broken lines 320. The ISDN transceiver unit 320 comprises an ISDN transceiver 321 and an associated S/T transceiver 323, which is ported to an RJ45 jack 324, for connection to ISDN-based customer equipment, such as an ISDN telephone 325 or other ISDN terminal equipment. The other tip and ring pair 316 is coupled to an auxiliary POTS termination jack 330 (e.g. a standard RJ11 jack), to which a customer may connect a standard analog telephone set 25.

Similar to the relay 260 of the modified U-BR1TE card 24M of FIG. 4, the switchable contacts of relay switch 310 are normally coupled to provide a circuit path between the tip and ring leads 241 and 242 of local loop 240 and the tip and ring pair 315 to transceiver unit 320. In the event of a loss of power, a drive signal to relay winding driver 317 will no longer be supplied by control processor 318. As a consequence, relay winding 311 becomes de-energized, causing the relay switch contacts 312 to translate to the (auxiliary POTS back-up) position shown in FIG. 5. In this position, a back-up circuit path is provided between the tip and ring leads 241 and 242 of local loop 240 and the tip and ring pair 316 to the auxiliary POTS termination jack 330, thereby allowing a customer-installed standard analog telephone set 25 to be used in place of the ISDN telephone equipment 325.

As described previously with reference to the modified U-BR1TE card 24M of FIG. 4, when the customer uses the auxiliary POTS phone 25 to place an outgoing call, pulse or tone dialing signals generated by the handset 25 are coupled (over the alternative path through relay 310 of the modified network termination interface) via the local loop 240 to DTMF and pulse detector 270, causing microcontroller 220 to output signals over the D channel link 214 to the PCM bus interface. Once the call is connected, the auxiliary digital/analog interface 250 is operative to convert sampled analog voice signals received over the local loop 240 from the auxiliary analog telephone 25 into digital communication signals (64 Kbps digitally formatted voice signals), that are coupled over link 255 to the PCM bus interface 210 for transmission in a B channel of the ISDN communication link of an outgoing T1 data stream over transmit bus 201. Conversely, in the receive direction, the digital/analog interface 250 is operative to convert standard digital (e.g. Q921/931) messages from the network in order to ring the auxiliary POTS phone 25, and applies regenerated analog voice signals over local loop 240 and relay 310 to path 316 for application to the auxiliary POTS phone 25.

When power is restored to the network termination equipment, microcontroller 318, upon re-initialization, controllably supplies a relay winding drive signal to relay driver 317. To allow for the completion of a call via the POTS phone 25, processor 318 monitors the output of loop current detector 319, to determine whether or not a POTS phone call is in progress (indicated by the presence of loop current through the tip/ring pair 316). If such a POTS phone call is in progress when power is restored, microcontroller 318 does not immediately apply a relay energizing signal to driver 317, but waits until the output of loop current detector 319 has changed state, indicating that loop current is no longer flowing through tip/ring pair 316. Processor 318 thereupon reasserts a drive input signal to relay driver 317, thereby causing the relay switch contacts 312 to return to their normal states, described above, so as to provide a circuit path between the tip and ring leads 241 and 242 of local loop 240 and the tip and ring pair 315, and thereby a path for the normal ISDN signalling channel with ISDN transceiver unit 320. Where the transceiver 320 generates a 10 KHz tone on power-up, the tone signal is transmitted over the local loop 240 and detected by 10 KHZ tone detector 268. Microcontroller 220 then deactivates relay 260, thereby decoupling the local loop 240 from the auxiliary digital/analog interface 250, and recoupling the local loop to signal transceiver unit 230.

Embodiment 2—Modified U-BR1TE Card with Smart Jack Connection to NT-1 Interface

Figure 6:
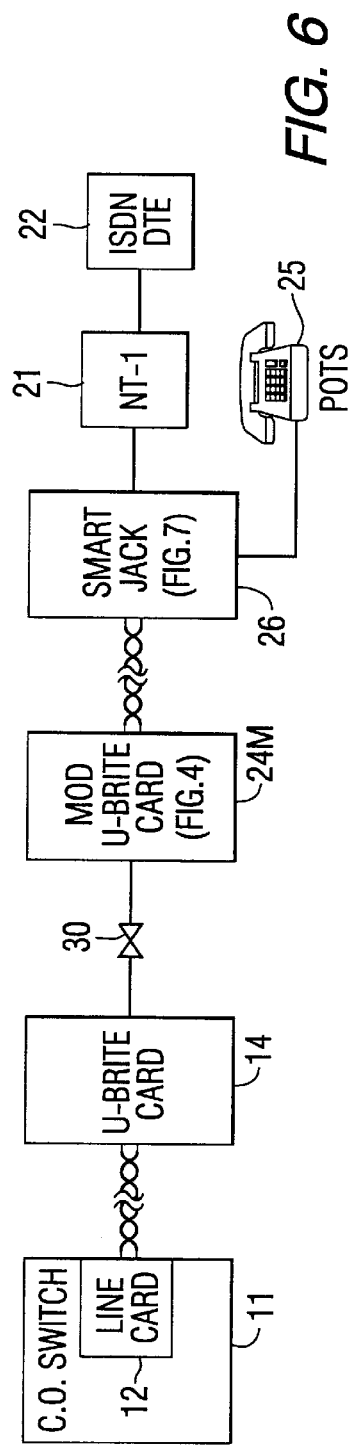
FIG. 6 diagrammatically shows a second embodiment of the invention, wherein a 'smart' jack module connects the local loop from a modified U-BR1TE card to an RJ45 jack of a conventional network termination interface.
Figure 7:
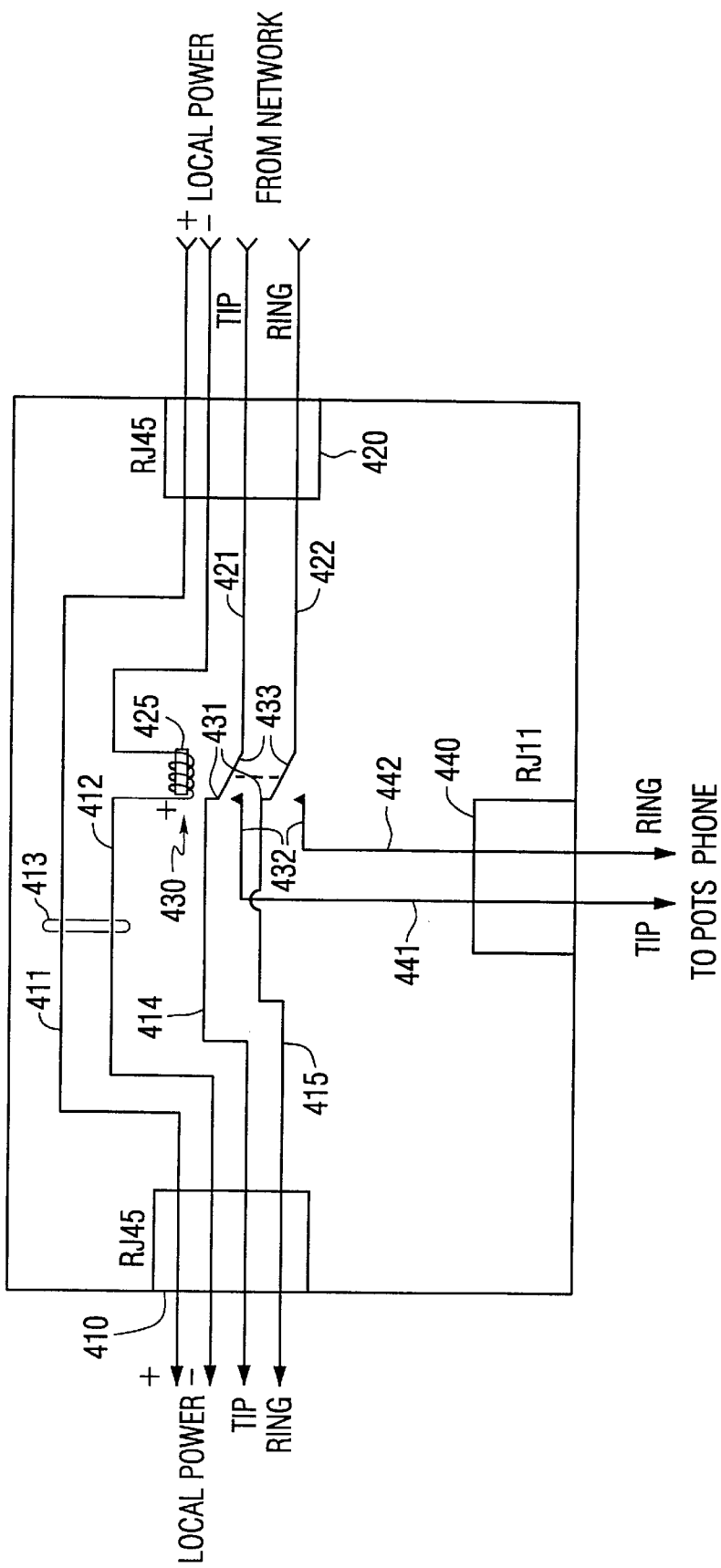
FIG. 7 diagrammatically illustrates the architecture of a smart jack.

FIGS. 6 and 7

Rather than install a modified network termination interface 21M of FIG. 5 to provide the auxiliary POTS signalling path and an associated loss of power-responsive relay switch, these auxiliary channel-connectivity functions may be effected through a separate 'smart' jack module, such as that illustrated at 26 in a second embodiment of the invention diagrammatically shown in FIG. 6, which connects the local loop 240 from the modified U-BR1TE card to the RJ45 jack of a conventional network termination interface 21 and is operative to provide separate RJ11 and RJ45 connections to the auxiliary POTS phone 25 and to the ISDN terminal equipment 22, respectively.

The architecture of 'smart' jack 26 is diagrammatically shown in FIG. 7 as having has a first RJ45 jack 410, which connects directly to the RJ45 jack of a standard network termination interface, corresponding to the RJ45 jack of a conventional network termination interface 21. A first lead 411 of the set of local power leads 413 of the RJ45 jack 410 is coupled directly to a second RJ45 jack 420, to which the local loop 240 is ported. A second lead 412 of the local power leads 413 of the RJ45 jack is coupled directly through a winding 425 of a relay 430 to second RJ45 jack 420. Respective tip and leads 414, 415 of RJ45 jack 410 are coupled to first contacts 431 of a set of fixed relay contacts 435. Respective tip and ring leads 441, 442 of an RJ11 jack 440 for auxiliary POTS phone 25 are coupled to second contacts 432 of the set of fixed relay contacts 430. Moveable contacts 433 of relay 430 are coupled to tip/ring leads 412, 422 of the second RJ45 jack 420.

Relay 430 in the 'smart' jack of FIG. 7 operates in the same manner as relay 310 in the modified network termination interface architecture of FIG. 5, described above, providing an ISDN connection channel for tip/ring and power between the first RJ45 jack 410 and second RJ45 jack 420, for normal ISDN mode of operation, and an auxiliary path between the tip/ring leads of the first RJ45 jack to the RJ11 jack 440, during POTS mode of operation. As in the modified network termination interface 21M of FIG. 5, power from the local power source 300 may be coupled through an intermediate switch (not shown), which may be manually operated by the customer, so as to prevent a POTS phone call from being interrupted when power is restored.

Figure 8:
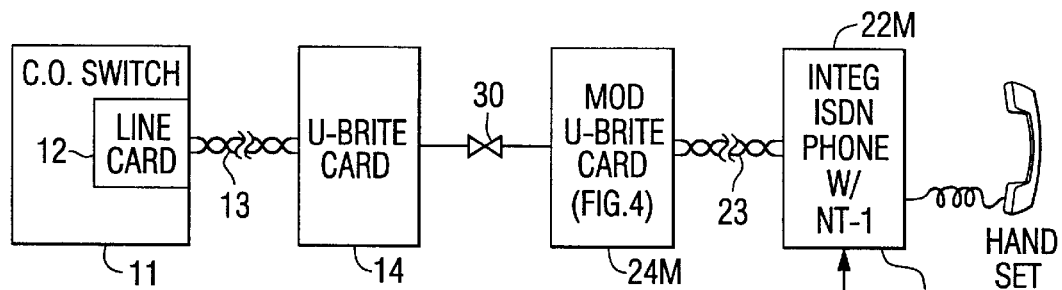
FIG. 8 diagrammatically illustrates a third embodiment of the invention for extended distance ISDN communications, wherein a U-BR1TE card and a network termination interface at the customer premises site are respectively replaced with a modified U-BR1TE card, and an integrated ISDN telephone and network termination interface unit, which includes a POTS phone back-up.
Figure 9:
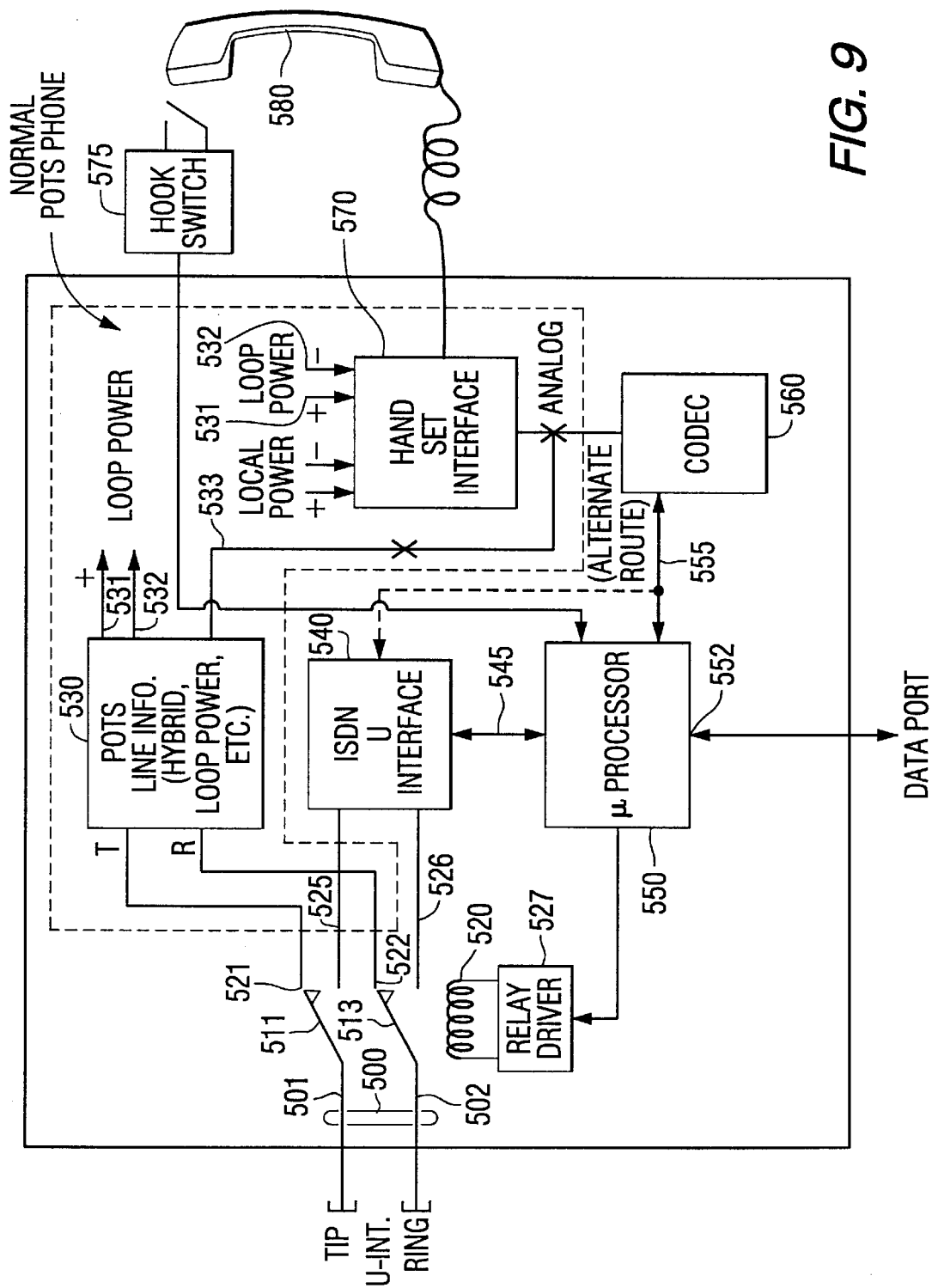
FIG. 9 is a detailed illustration of an integrated ISDN telephone and network termination interface unit.

Embodiment 3—Modified U-BR1TE Card with Integrated ISDN Phone having Pots Back-up FIGS. 8 and 9

FIG. 8 diagrammatically illustrates a third embodiment of the invention for extended distance ISDN communications, wherein the U-BR1TE card 24 and network termination interface 21 at the customer premises site are respectively replaced with the modified U-BR1TE card 24M of FIG. 4, described above, and an integrated ISDN telephone and network termination interface unit 22M, which includes a POTS phone back-up.

The integrated ISDN telephone and network termination interface unit 22M is shown in detail in FIG. 9 as comprising a tip/ring interface 500 which has respective links 501 and 503 ported to the respective tip and ring leads 241 and 242 of the local twisted cable pair loop 240 from the modified U-BR1TE card 24M of FIG. 4. Tip link 501 is coupled to a first switchable arm 511 of a relay 510, while ring link 503 is coupled to a second switchable arm 513 of a relay 510. Relay 510 includes a winding 520, which is normally energized by a relay driver 527, under the control of a communications control processor 550.

In response to a loss of power, a drive signal is no longer applied to relay driver 527 by control processor 550, thereby de-energizing relay winding 520 and causing its switchable arms 511 and 512 to translate to their 'loss of power' positions shown in FIG. 9, wherein switchable arms 511 and 513 are respectively connected through a first pair of lines 521 and 523 to the tip and ring ports of a POTS line hybrid interface 530, which provides local loop power to a pair of lines 531 and 532 and an internal bidirectional communication line 533. In their normal ISDN-connective positions, with relay winding 520 energized, switchable arms 511 and 513 are respectively connected through a second pair of lines 525 and 526 to the tip and ring ports of an ISDN transceiver (U interface) unit 540, corresponding to that of ISDN transceiver 230 of FIG. 4).

In the normally locally powered condition of the customer premises equipment, ISDN transceiver unit 540 ports 2B1Q-formatted symbols one tip and ring pair 525 and 526 through relay 510 to port 500.

ISDN Transceiver 540 is controlled by control microcontroller 550 via a control link 545. ISDN transceiver 540 is also coupled via link 555 to a codec 560, which is interfaced via link 533 with POTS line hybrid interface 530 and a hand set interface unit 570. Hand set interface 570 has an associated hook switch 575 and hand set 580 through which the customer conducts ISDN voice communications with the network. Microcontroller 550 has an auxiliary data port 552 (e.g. an RS-232 port) for external digital data communications.

During normal ISDN operation, with local power applied (relay winding 520 energized by relay driver 527 under the control of control processor 550), the switchable arms 511 and 513 of relay 510 are in the positions opposite those shown in FIG. 9, so that U interface 540 and codec 560 and the SLI are controllably connected in circuit through the contacts of powered relay 510 between port 500 to the local loop and the hand set interface 570. As a result, the customer is able to conduct standard 2B1Q-formatted ISDN voice communications with the network in a conventional manner.

In the event of a loss of local power, however, a relay drive signal is no longer output by microcontroller 550 to relay driver 527, so that relay winding 520 is de-energized, and the switchable arms 511 and 513 are respectively connected through lines 521 and 523 to the tip and ring ports of a POTS line hybrid interface 530, whereby internal loop power may be drawn via port 500 from the local loop 240. This internal loop power is coupled via links 531 and 533 to the hand set interface 570, so as to support a back-up analog voice channel via link 533 to the POTS line hybrid interface 530 from the hand set 580. In this manner the customer has a POTS analog link through the hybrid to the local loop 240 and thereby to the modified U-BR1TE card 24M of FIG. 4, described above.

When power is restored to the customer premises equipment, microcontroller 550, upon re-initialization, controllably supplies a relay winding drive signal to relay driver 527. To allow for the completion of a call via the hybrid 530, processor 550 monitors the state of hook switch 575, to determine whether or not a POTS phone call is in progress (indicated by the handset 580 being off-hook). If such a POTS phone call is in progress when power is restored, microcontroller 550 does not immediately apply a relay energizing signal to driver 527, but waits until the output of the hook switch 575 has changed state, indicating that the customer has replaced the hand set 580 back in its cradle, terminating the POTS phone call. Processor 550 thereupon reasserts a drive input signal to relay driver 527, thereby causing the relay switch contacts 511 and 513 to return to their normal states, described above, so as to provide a circuit path between the tip and ring leads 501 and 502 of the loop 500 and tip and ring leads 525 and 526 to the ISDN interface 540. Where transceiver 540 generates a 10 KHz tone on power-up, the tone signal is transmitted over the local loop 240 and detected by the 10 KHZ tone detector 268 in the modified BR1TE card 24M, as described previously.

Figure 10:
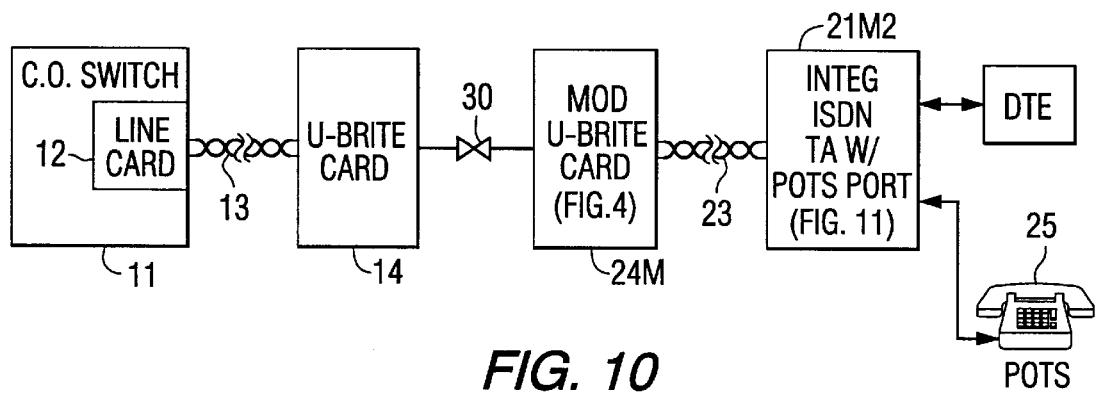
FIG. 10 diagrammatically illustrates a fourth embodiment of the present invention, wherein the modified network termination interface of the extended distance system of FIG. 3 is replaced by an integrated ISDN terminal adapter and network termination interface.
Figure 11:
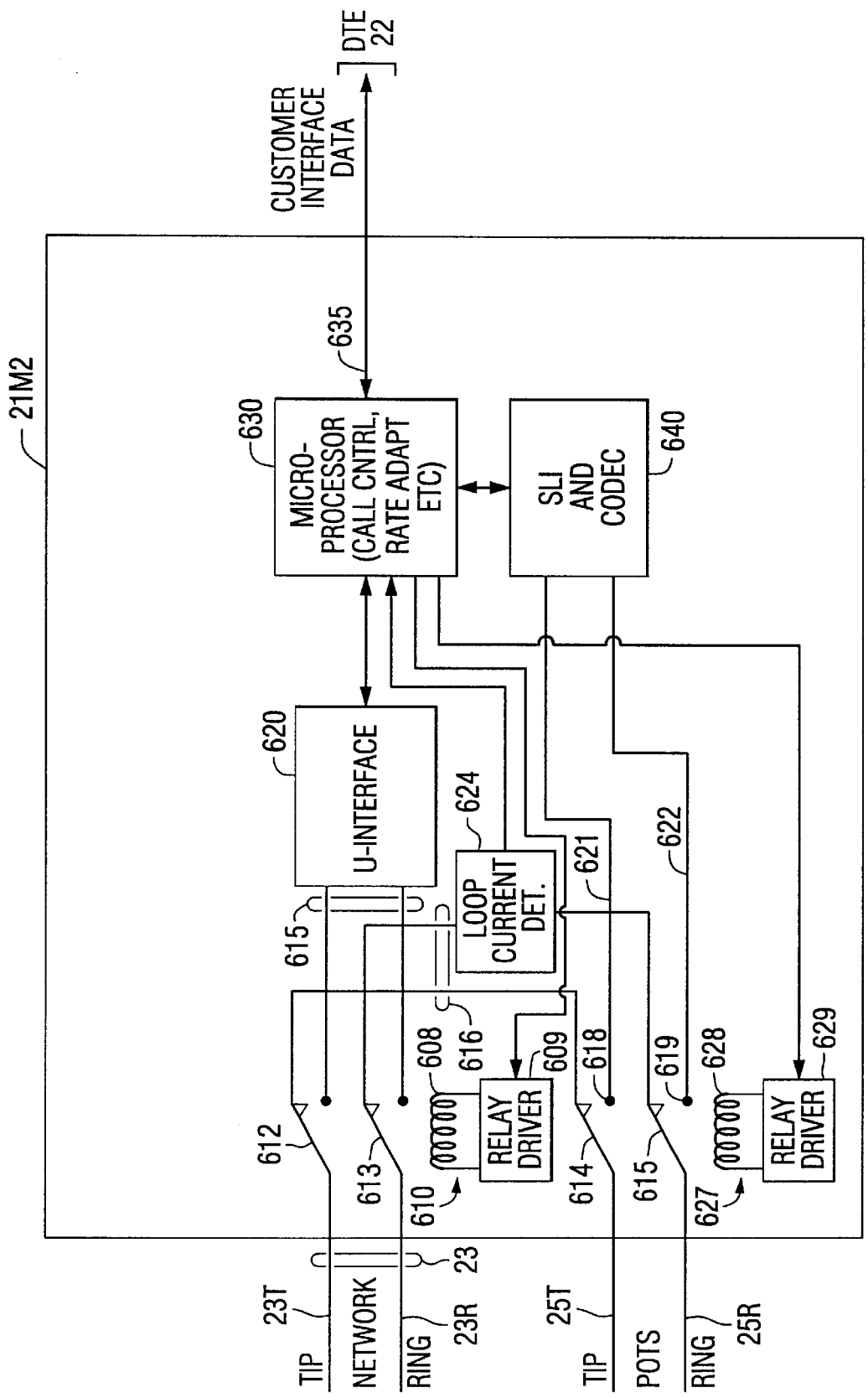
FIG. 11 is a detailed illustration of an integrated ISDN terminal adapter and network termination interface.

Embodiment 4—Modified U-BR1TE Card with Integrated ISDN Terminal Adapter, NT-1 with Pots Port FIGS. 10 and 11

In accordance with a fourth embodiment of the present invention, diagrammatically illustrated in FIG. 10, the modified network termination interface NT-1 21 of the extended distance system of FIG. 3 is replaced by an integrated ISDN terminal adapter and network termination interface 21M2, shown in detail in FIG. 11, described below. The integrated ISDN terminal adapter and network termination interface 21M2 is similar to the modified network termination interface architecture of FIG. 5 in that it includes a normal ISDN signalling path (to which a POTS phone is coupled) and an associated loss of power-responsive relay switch, which by-passes the ISDN signalling path and substitutes an auxiliary analog POTS phone path in place of the normally employed ISDN signalling path, so that the POTS phone may be connected directly via the local loop 240 to the modified U-BR1TE card 24M associated with the customer premises site.

More particularly, the integrated ISDN terminal adapter and network termination interface 21M2 of FIG. 11 includes a relay switch 610, having a first winding 608 connected to a relay driver 609. Relay driver 609 receives a drive signal from a supervisory control microprocessor 630, which is ported via a digital data interface port 635 to local digital data terminal equipment, which may be ISDN telephone or other ISDN terminal equipment. A first pair of switch contacts 612 and 613 of relay switch 610 are connected in circuit with the tip and ring leads 23T and 23R of the local loop 23 and first and second alternative tip and ring pairs 615 and 616.

The first tip and ring pair 615 is coupled to provide a path for the normal 2B1Q ISDN signalling channel with an ISDN transceiver unit 620, which is coupled to control processor 630. The other tip and ring pair 616 is coupled to a second pair of switch contacts 614 and 615 of a second relay switch 627, which has a relay winding 628 connected to a relay driver 629. Like relay driver 609, relay driver 629 receives a drive signal from supervisory control microprocessor 630. Switch contacts of relay 627 are ported via a tip and ring pair 25T and 25R to POTS phone 25. A further tip and ring pair 621 and 622 are coupled from switch contacts 618 and 619, respectively, to an SLI/codec unit 640, which is interfaced with processor 630.

When local power is normally applied, processor 630 supplies driver energizing signals to each of relay drivers 609 and 629, so as to energize each of relay windings 608 and 628. As a result, switchable contacts 612 and 613 of relay switch 610 provide a circuit path between the tip and ring leads 241 and 242 of the local loop 240 via the tip and ring pair 615 to transceiver unit 620. Also, switchable contacts 614 and 615 of relay switch 627 provide a circuit path between the tip and ring leads 25T and 25R of the POTS phone 25 and switch contacts 618 and 619, respectively, so that the POTS phone is connected to the SLI/codec unit 640. In this normal mode of operation, the POTS phone 25 is interfaced with the ISDN interface circuit functionality of the codec, SLI and transceiver components of the interface, so that it effectively appears to the modified U-BR1TE card 24M as a piece of ISDN data terminal equipment.

Should there be a loss of local power, however, the ISDN signal processing circuitry within the modified network termination interface 21M2 of FIG. 11 will become disabled, preventing the use of the POTS phone for normal ISDN communications. In this event, control processor 630 no longer supplies relay driver energizing signals to relay drivers 609 and 629, so that each of relay windings 608 and 628 is de-energized, causing switch contacts 612, 613, 614 and 615 to transition to the positions shown in FIG. 11, whereby the tip and ring leads 241 and 242 of the local loop 240 are directly connected to the tip and ring leads 25T and 25R, respectively of the POTS phone 15, by-passing the ISDN signal processing circuitry of the interface.

A loop current detector 624 is coupled in circuit with the tip/ring path between the local loop 23 and the POTS phone 25. When power is restored, microcontroller 630, upon re-initialization, controllably supplies a relay winding drive signal to each of relay drivers 609 and 629. To allow for the completion of a call via switched tip/ring path, processor 630 monitors the state of loop current detector 624, to determine whether or not a POTS phone call is in progress (indicated by the presence of loop current). If such a POTS phone call is in progress when power is restored, microcontroller 630 does not immediately apply a relay energizing signal to drivers 609 and 629, but waits until the output of the loop current detector 624 has changed state, indicating that the customer has gone on-hook, terminating the call. Processor 630 thereupon reasserts drive input signals to relay drivers 609 and 629, thereby causing the relay switch contacts to return to their normal states, described above.

Pots Back-up for Non-extended Distance ISDN Communications

As pointed out above, in addition to providing back-up emergency POTS service for extended distance ISDN applications, the present invention may also be employed to provide emergency (loss of power) back-up POTS service for a non-extended distance ISDN communication system, in which the local loop from a respective line card in the central office switch is coupled directly to the network termination interface (NT-1) circuit, rather than to a UBR1TE transceiver card for effecting extended distance communications via the (distance-extending) PCM (fiber optic) link.

Embodiment 5—Modified Line Card, Modified NT-1 Interface

FIG. 12

Figure 2:
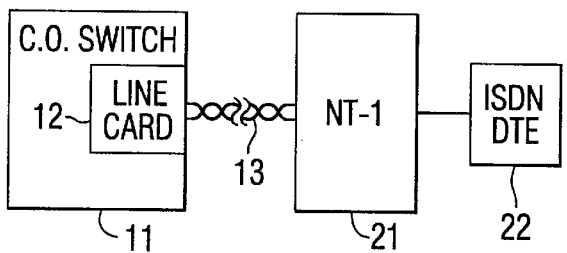
FIG. 2 diagrammatically illustrates a non-extended distance ISDN communication system.
Figure 12:
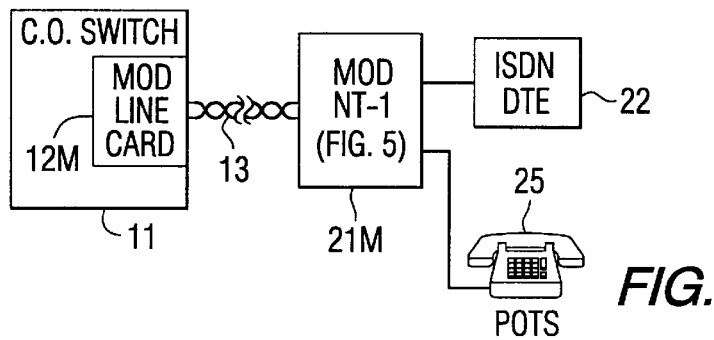
FIG. 12 shows a fifth embodiment of the invention, wherein loss of power POTS back-up service is provided to a non-extended distance ISDN communication system, with the network termination interface being replaced by the modified network termination interface of FIG. 5.

Pursuant to a fifth embodiment of the present invention, loss of power POTS back-up service is provided to the non-extended distance ISDN communication system diagrammatically illustrated in FIG. 12, wherein the network termination interface NT-1 21 of the non-extended distance system of FIG. 2 is replaced by the modified network termination interface NT-1 24M, shown in detail in FIG. 5, described above. As in the previous embodiments of the invention for extended distance applications, the integrity of the ISDN communication path (local loop) between the network termination interface and the central office switch remains unaffected, so that the central office equipment continues to conduct standard ISDN communications with the customer premises equipment, even though the customer is again employing a POTS back-up phone.

In this embodiment, since the modified network termination interface NT-1 24M causes the analog signals of the POTS phone 25 to be applied through signal path 290 directly to the local loop 13 for transport to the line card of the central office switch, it its necessary to replace the line card with a modified line card 12M, which is configured to replicate the modified U-BR1TE card 24M configuration of FIG. 4. When so installed, the control software employed by microcontroller 220 within the modified U-BR1TE replacement configured line card 12M continuously monitors the local loop (here, loop 13) in order to determine the ability of the modified network termination interface NT-1 24M to provide normal telephone service with the customer's data terminal equipment (DTE) 22. In response to detecting a loss of power condition, the microcontroller 220 within the modified line card 12M generates a switch control output signal that operates the relay 260 and thereby causes the tip and ring leads of the local loop 13 to be decoupled from the tip and ring path for normal ISDN signal processing in transceiver unit 230 and, instead, couples the local loop 240 through the auxiliary tip and ring pair to the digital/analog interface 250 to the local loop.

When placed in the POTS mode, control signals from the customer's POTS phone applied to the local loop 13 are output as standard (Q921/931) messages over the D channel link from the microcontroller 220. As explained above, the auxiliary digital/analog interface 250 is operative to convert sampled analog voice signals received over the local loop from the auxiliary analog (POTS) telephone 25 into (64 Kbps) digitally formatted voice signals, for transmission via a B channel portion of the ISDN communication link. In the receive direction, the auxiliary digital/analog interface 250 regenerates outgoing analog voice signals for application via the relay to the local loop 13.

Embodiment 6—Modified Line Card with Integrated ISDN Phone having Pots Back-up

FIG. 13

Figure 13:
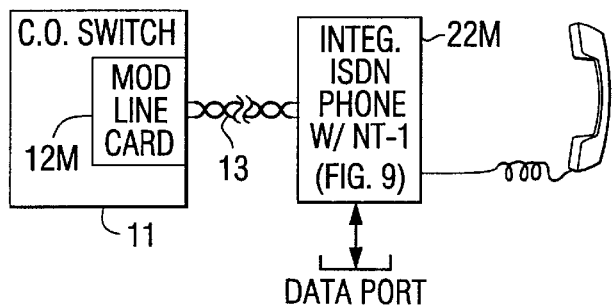
FIG. 13 diagrammatically illustrates a sixth embodiment of the invention, for non-extended distance ISDN communications, wherein the network termination interface at the customer premises site is replaced with the integrated ISDN telephone and network termination interface unit.

FIG. 13 diagrammatically illustrates a sixth embodiment of the invention, for non-extended distance ISDN communications, wherein the network termination interface 21 at the customer premises site is replaced with the integrated ISDN telephone and network termination interface unit 22M, which includes a POTS phone back-up, shown in FIG. 9, described above. In this embodiment, as in the fifth embodiment of FIG. 12, since the integrated ISDN telephone and network termination interface unit 22M, which includes a POTS phone back-up, also causes the analog signals of the POTS phone 25 to be applied to the local loop 13 for transport to the line card of the central office switch, it its necessary to replace the line card with a modified line card 12M, which is configured to replicate the modified U-BR1TE card 24M configuration of FIG. 4, as described above.

Embodiment 7—Modified Line Card with Integrated ISDN Terminal Adapter, NT-1 with Pots Port

FIG. 14

Figure 14:
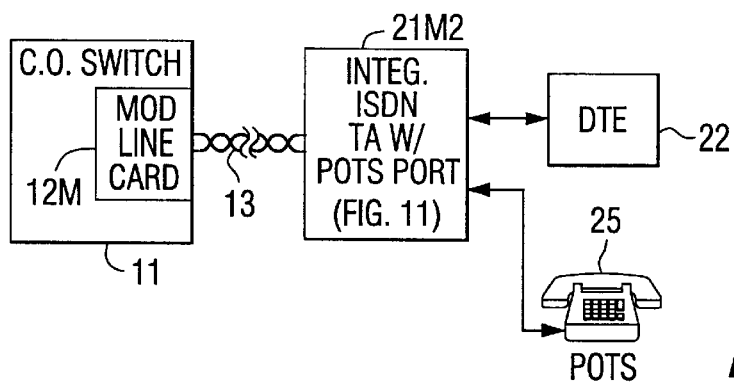
FIG. 14 diagrammatically illustrates a seventh embodiment of the present invention, wherein the modified network termination interface of the non-extended distance system of FIG. 2 is replaced by an integrated ISDN terminal adapter and network termination interface.

Pursuant to a seventh embodiment of the present invention, diagrammatically illustrated in FIG. 14, the modified network termination interface NT-1 21 of the non-extended distance system of FIG. 2 is replaced by the integrated ISDN terminal adapter and network termination interface 21M2, shown in detail in FIG. 11, described above. In addition, since the integrated ISDN terminal adapter and network termination interface 21M2, shown in detail in FIG. 11, interfaces the POTS phone 25 analog signals with the local loop 13 to the line card of the central office switch, it is again necessary to replace the line card with a modified line card 12M, configured to replicate the modified U-BR1TE card 24M configuration of FIG. 4, as described above.

Embodiment 8—Modified Line Card with Smart Jack Connection to NT-1 Interface

FIG. 15

Figure 15:
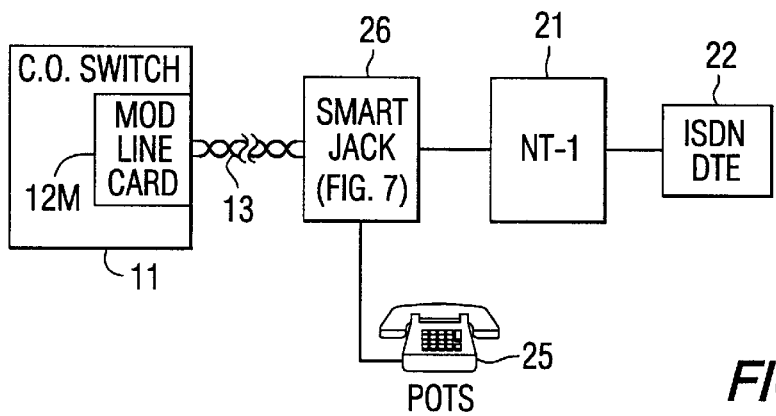
FIG. 15 diagrammatically illustrates an eighth embodiment of the invention for non-extended ISDN applications, wherein auxiliary channel-connectivity functions are provided through a smart jack module which connects the local loop from a modified line card in a central office switch to an RJ45 jack of a network termination interface.

In an eighth embodiment of the invention, similar to the second embodiment for extended ISDN applications, rather than employ the modified network termination interface 21M of FIG. 5 to provide the auxiliary POTS signalling path and an associated loss of power-responsive relay switch, these auxiliary channel-connectivity functions are provided through separate 'smart' jack module 26, as diagrammatically shown in FIG. 15, which connects the local loop 13 from a modified line card 12M in the switch to the RJ45 jack of a conventional network termination interface 21 and is operative to provide separate RJ11 and RJ45 connections to the auxiliary POTS phone 25 and to the ISDN terminal equipment 22, respectively.

Embodiment 9—Smart Jack Connection to Unmodified Line Card Via ISDN Pots Back-up Interface

Figure 16:
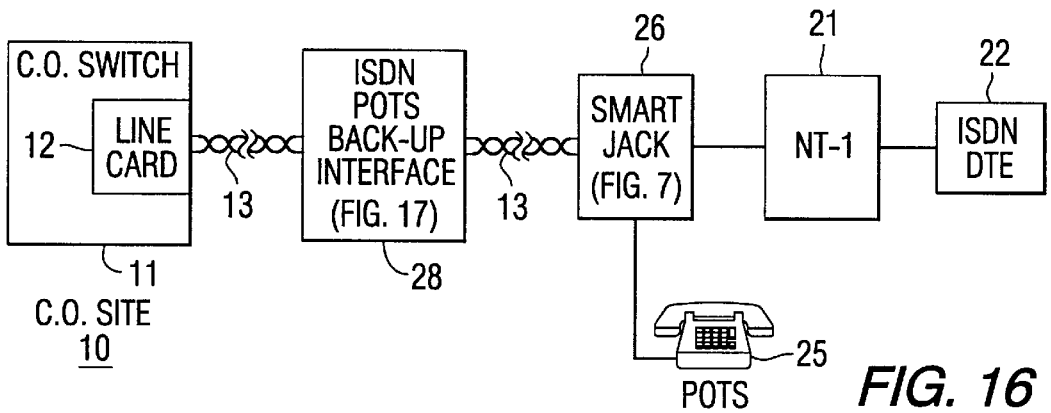
FIG. 16 diagrammatically illustrates a ninth embodiment of the present invention, wherein a smart jack module connects the local loop to an RJ45 jack of a network termination interface and is operative to provide separate RJ11 and RJ45 connections to an auxiliary POTS phone and to ISDN terminal equipment.
Figure 17:
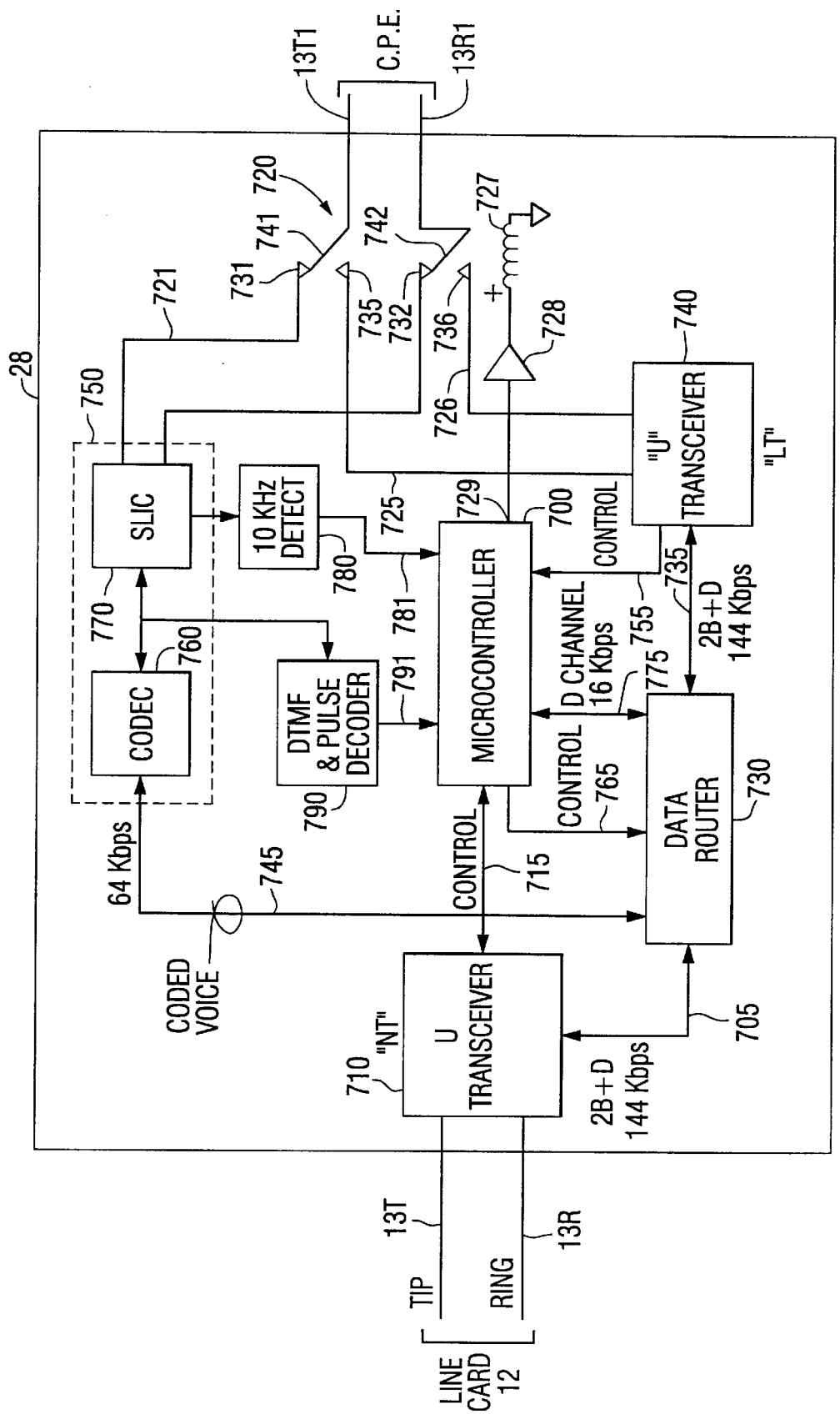
FIG. 17 illustrates the details of an ISDN POTS back-up interface.

FIGS. 16 and 17

In accordance with a ninth embodiment of the present invention, loss of power POTS back-up service is provided to the non-extended distance ISDN communication system diagrammatically illustrated in FIG. 16, wherein, similar to the extended distance system architecture of FIG. 6, the 'smart' jack module 26 (shown in detail in FIG. 7, described above) connects the local loop 13 to an RJ45 jack of a conventional network termination interface 21 and is operative to provide separate RJ11 and RJ45 connections to the auxiliary POTS phone 25 and to the ISDN terminal equipment 22, respectively. In this embodiment, in order to accommodate the analog signalling format of the POTS phone, rather than replace the line card 12 in the central office switch 11 with a modified line card 12M, an ISDN POTS back-up interface is installed in the local loop 13, as shown at 28 in FIG. 16.

As shown in detail in FIG. 17, the ISDN POTS back-up interface 28 is configured similar to the modified U-BR1TE card configuration of FIG. 4 and includes an auxiliary digital/analog interface 750, a loop relay 720 and, associated with the card's microcontroller 700, a loss of power monitoring mechanism, which, in the event of an emergency POTS mode of operation, is operative to selectively control the operation of the loop relay 720, and thereby control the substitution of the auxiliary digital/analog interface 750 in place of the normally employed ISDN transceiver circuitry.

In the ISDN POTS back-up interface of FIG. 17, respective tip and ring leads 13T and 13R of the network side of local loop 13 are terminated by way of a network termination U transceiver interface 710, which interfaces 2B1Q data with the network side of local loop 13. Network termination U transceiver interface 710 is controlled by microcontroller 700 via a control link 715, and is also coupled via a first ISDN bus 705 to a data router unit 730. Data router 730 is coupled via a second ISDN bus 735 to a loop termination U interface transceiver 740, which interfaces 2B1Q data with the customer premises side of local loop 13. The data router 730 is operative to either transparently and bidirectionally route 2B+D data between transceivers 710 and 740, or route 1B+D data between the network U transceiver 710 and a codec 760 within the auxiliary digital/analog interface 750, by way of a bus 745, during POTS back-up mode. Microcontroller 700 is coupled to loop termination U interface transceiver unit 740 via a control link 755, and to data router 730 via a control link 765. D channel data is coupled between microcontroller 700 and data router 730 by way of bus 775.

The auxiliary digital/analog interface 750 of the ISDN POTS back-up interface of FIG. 17 includes codec unit 760 and a subscriber loop interface (SLI) 770. The codec 760 and the SLI 770 are controllably connected in circuit between bus 745 to the data router 730 and tip and ring leads 721 and 722, respectively, to first terminal contacts 731 and 732 of relay 720. U transceiver interface 740 is coupled via respective tip and ring leads 725 and 726, respectively, to second terminal contacts 735 and 736 of relay 720. A pair of switchable arms 741 and 742 of relay 720 are coupled to respective tip and ring leads 13T1 and 13R1 of the customer premises side of the interface. Relay 720 has a winding 727 coupled to a relay driver 728 which is controlled by microcontroller 700.

SLI 770 is also coupled to each of a 10 KHz tone detector 780 and a dual tone multifrequency (DTMF) and pulse detector 790, respective outputs 781 and 791 of which are coupled to microcontroller 700. The 10 KHz tone detector 780 is employed as a wake-up tone detector and supplies an output signal over line 781 to the microcontroller 700, in response to the network termination interface at the customer premises generating a 10 KHz tone upon power-up. DTMF detector 790 produces signals on line 791 associated with tone signals (such as dial tones) sourced from the customer premises equipment 22.

As in the modified U-BR1TE card configuration of FIG. 4, described previously, the control software employed by microcontroller 700 monitors the local loop leads 13T1, 13R1 to the network termination interface 21, in order to determine the ability of the network termination interface to provide normal telephone service with the customer's data terminal equipment (DTE) 22. For this purpose, microcontroller 700 employs a loss of power monitoring mechanism, which monitors the signalling condition on the tip and ring pair 13T1, 13R1 via U-transceiver unit 740, by looking for a signalling condition representative of loss of power to the network termination interface, as described above.

In response to detecting a loss of power condition, microcontroller 700 generates a switch control output signal on line 729 to relay driver 728, so as to operate relay 720 and thereby cause the tip and ring leads 13T1 and 13R1 of the customer premises side of the local loop to be decoupled from contacts 735 and 736 and the tip and ring path for normal ISDN signal processing to U-transceiver unit 740 and, instead, couples the local loop leads 13T1 and 13R1 to contacts 731 and 732 to auxiliary tip and ring leads 721 and 722 to digital/analog interface 750.

When placed in this POTS back-up mode, control signals (pulse or tone dialing signals) from the customer's POTS phone 25 are output as standard (Q921/931) messages over D channel link 775 from microcontroller 700 to the data router 730 for application to the D channel portion of bus 705 and transmission on the network side of the local loop by way of U transceiver 710. Digital/analog interface 750 converts sampled analog voice signals received from the POTS telephone 25 into 64 Kbps digitally formatted voice signals, that are coupled over ISDN bus 745 to data router 730 for application via a B channel portion of the ISDN communication bus 705 of U transceiver interface 710 and transmission therefrom as 2B1Q data over the network side of the local loop 13 to the line card in the central office.

In the receive direction from the network side of the local loop 13, incoming 2B1Q signals from the line card 12 are converted by transceiver 710 into 2B+D signals and applied via ISDN bus 705 to data router 730. The data router couples the bearer (B) channel (coded voice) data over link 745 from transceiver 710 to auxiliary digital/analog interface 750, which regenerates outgoing analog voice signals for application over tip/ring pair leads 721, 722 through relay 720 to the tip and ring leads 13T1 and 13R1 of the customer premises side of the local loop.

Similar to the operation of the modified U-BR1TE card architecture of FIG. 4, described above, in response to power being restored to the customer premises equipment (corresponding to a signalling recovery condition), where the network termination interface is designed to generate a 10 KHz tone on power-up, a signal is coupled over line 781 from 10 KHz tone detector 780 to microcontroller 700, indicating that the POTS phone 25 is not in use (OFF-HOOK). (If the POTS phone 25 is currently OFF-HOOK, the call is allowed to be completed.) Microcontroller 700 then deactivates relay 720, decoupling the customer premises side of the local loop 13 from auxiliary digital/analog interface 750, and recoupling leads 13T1 and 13R1 to loop termination U transceiver 740.

Where the network termination interface is of the type that does not transmit a 10 KHz tone on power-up, microcontroller 700 may periodically deactivate relay 720 and thereby repeatedly decouple auxiliary digital/analog interface 750 from the local loop, and then recouple the local loop to transceiver interface 740. During each of these periodic change-overs, U transceiver interface 740 attempts to reestablish digital communication capability over the local loop with the network termination interface 21. If it is unable to do so within a prescribed period of time, microcontroller 700 again switches the relay 720 back to the POTS mode configuration, and thereby returns the connection between the customer premises side of the local loop and the auxiliary digital/analog interface 750, so as to decouple the local loop from the U transceiver interface 740.

Embodiment 10—Integrated ISDN Phone having Pots Back-up Connection to Unmodified Line Card Via ISDN Pots Back-up Interface

FIG. 18

Figure 18:
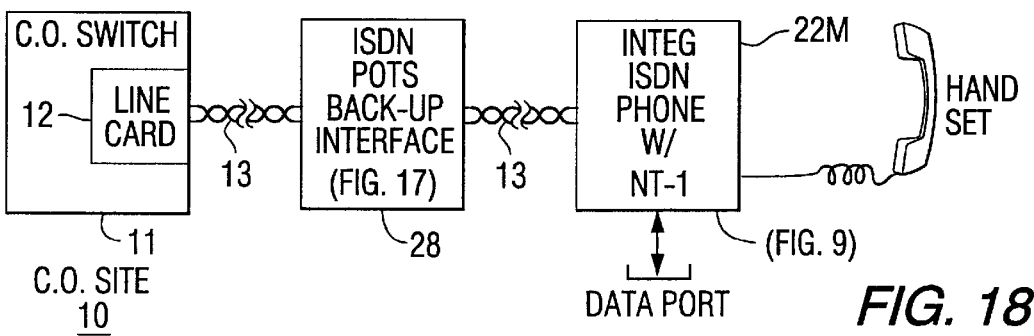
FIG. 18 diagrammatically illustrates a tenth embodiment of the present invention, wherein the network termination interface at the customer premises site is replaced with an integrated ISDN telephone and network termination interface unit, and which includes an integrated ISDN telephone and network termination interface of FIG. 11.

In accordance with a tenth embodiment of the present invention, loss of power POTS back-up service is provided to the non-extended distance ISDN communication system diagrammatically illustrated in FIG. 18, wherein, similar to the extended distance system architecture of FIG. 8, the network termination interface 21 at the customer premises site is replaced with the integrated ISDN telephone and network termination interface unit 22M, which includes a POTS phone back-up, shown in detail in FIG. 9. As in the ninth embodiment of FIGS. 8 and 9, in order to accommodate the analog signalling format of the POTS phone, rather than replace the line card 12 in the central office switch 11 with a modified line card 12M, the ISDN POTS back-up interface 28 of FIG. 9 is installed in the local loop 13.

Embodiment 11—Integrated ISDN Terminal Adapter with Pots Connection to Unmodified Line Card Via ISDN Pots Back-up Interface

FIG. 19

Figure 19:
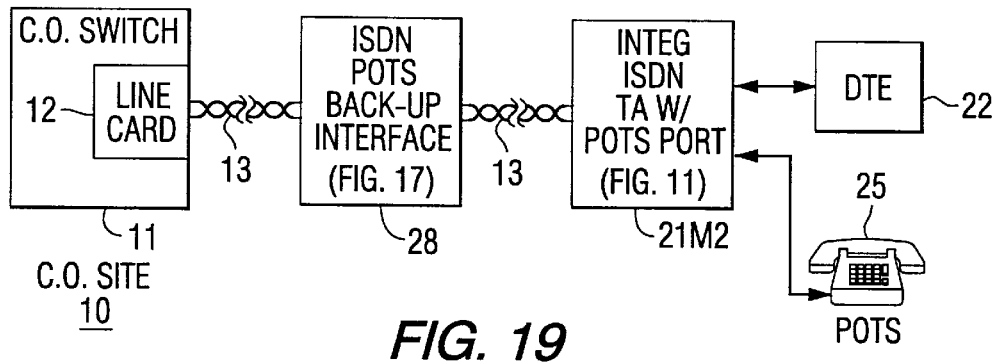
FIG. 19 diagrammatically illustrates an eleventh embodiment of the invention, wherein the modified network termination interface of the non-extended distance system of FIG. 2 is replaced by the integrated ISDN terminal adapter and network termination interface of FIG. 11 and which includes an integrated ISDN telephone and network termination interface of FIG. 11.

Pursuant to an eleventh embodiment of the invention, diagrammatically illustrated in FIG. 19, the modified network termination interface NT-1 21 of the non-extended distance system of FIG. 2 is replaced by the integrated ISDN terminal adapter and network termination interface 24M2, shown in detail in FIG. 11, described above. In addition, as in the ninth and tenth embodiments, in order to accommodate the analog signalling format of the POTS phone, rather than replace the line card 12 in the central office switch 11 with a modified line card 12M, the ISDN POTS back-up interface 28 of FIG. 9 is installed in the local loop 13 between the line card 12 and the integrated ISDN terminal adapter and network termination interface 24M2.

Embodiment 12—Modified NT1 Interface with Pots Back-up Connection to Unmodified Line Card Via ISDN Pots Back-up Interface

FIG. 20

Figure 20:
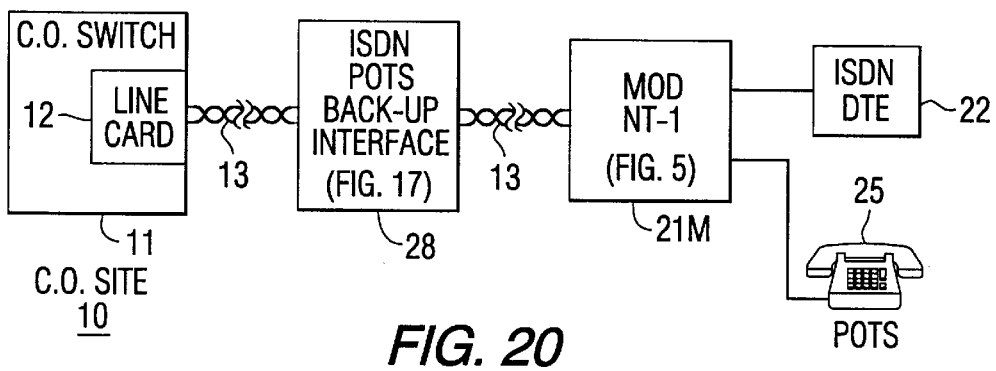
FIG. 20 diagrammatically illustrates a twelfth embodiment of the present invention, wherein the network termination interface of the non-extended distance system of FIG. 2 is replaced by the modified network termination interface of FIG. 5, and includes an integrated ISDN telephone and network termination interface of FIG. 11.

Pursuant to a twelfth embodiment of the present invention, diagrammatically illustrated in FIG. 20, POTS back-up service is provided to a non-extended distance ISDN communication system, wherein the network termination interface NT-1 21 of the non-extended distance system of FIG. 2 is replaced by the modified network termination interface NT-1 24M, shown in detail in FIG. 5, described above. In addition, as in the ninth through eleventh embodiments, in order to maintain integrity of the ISDN communication path (local loop) between the network termination interface and the central office switch, for the analog signalling format of the POTS phone, rather than replace the line card 12 in the central office switch 11 with a modified line card 12M, the ISDN POTS back-up interface 28 of FIG. 9 is installed in the local loop 13 between the line card 12 and the integrated ISDN terminal adapter and network termination interface 21M2.

Figure 21:
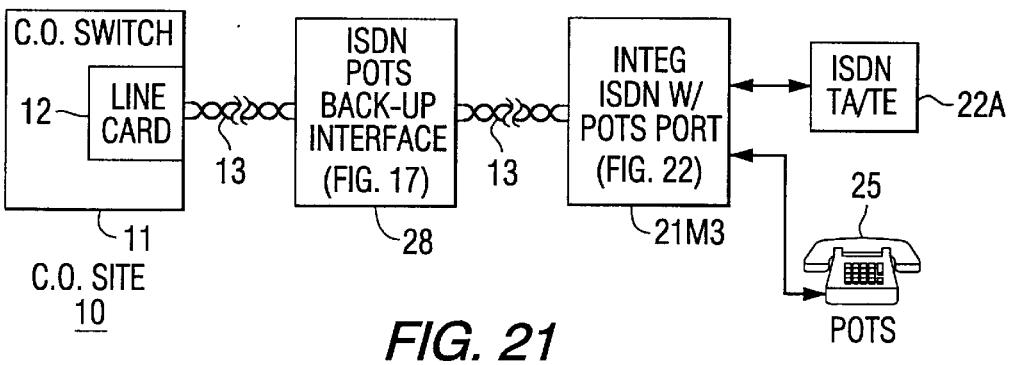
FIG. 21 diagrammatically illustrates a thirteenth embodiment of the invention, wherein the eleventh embodiment is modified so that the integrated ISDN terminal adapter and network termination interface is replaced by a modified configuration to provide for connection to an ISDN SIT interface port.
Figure 22:
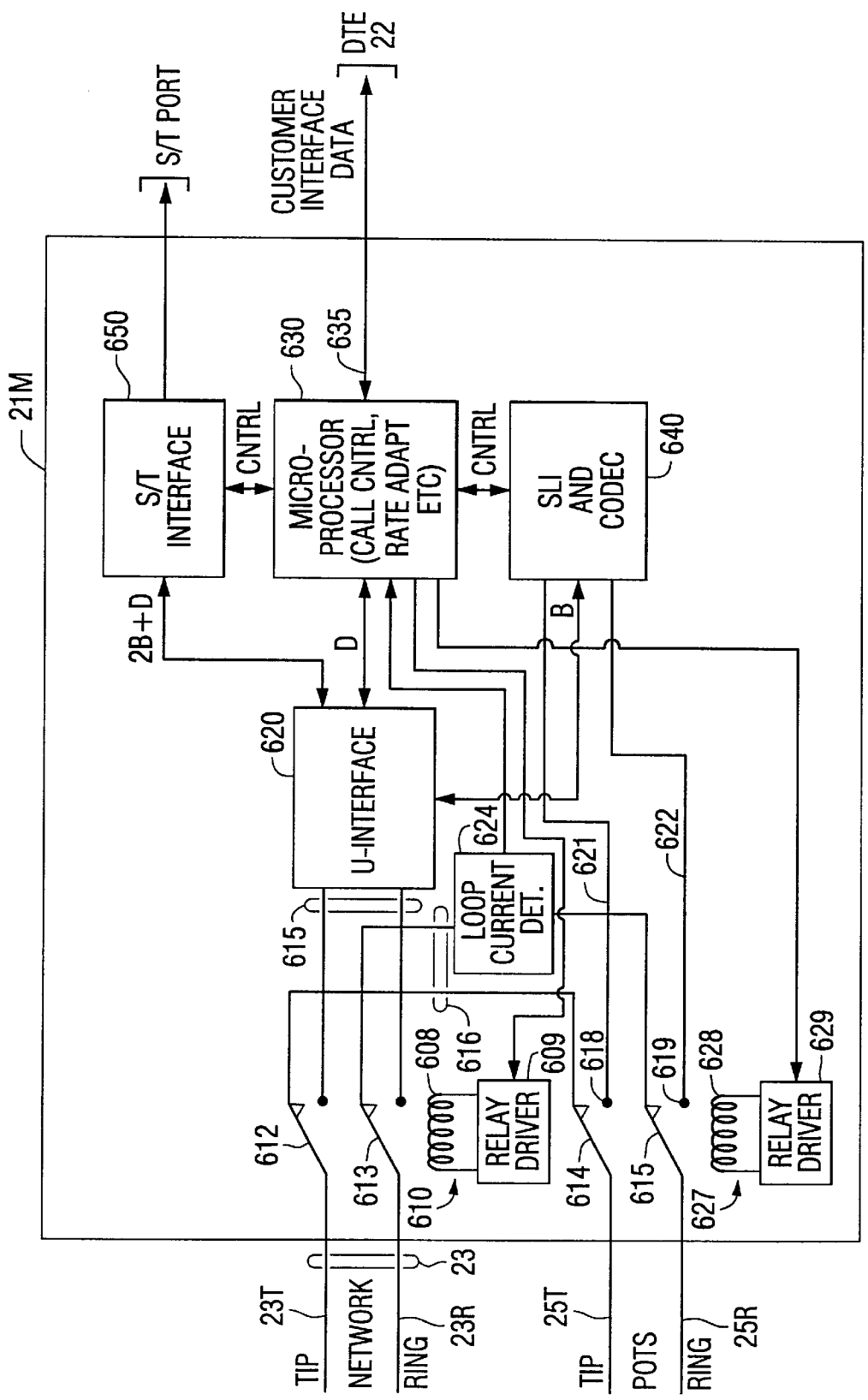
FIG. 22 is a detailed illustration of the modified integrated ISDN terminal adapter and network termination interface employed in the embodiment of FIG. 21.

Embodiment 13—Integrated ISDN Terminal Adapter with ISDN S/T Interface and Pots Back-up Connection to Unmodified Line Card Via ISDN Pots Port FIGS. 21 and 22

Pursuant to a thirteenth embodiment of the invention, diagrammatically illustrated in FIGS. 21 and 22, in the embodiment of FIG. 19, the integrated ISDN terminal adapter and network termination interface 21M2, shown in detail in FIG. 11, described above is replaced by the modified configuration 24M3 shown in FIG. 22, to provide for connection to an ISDN S/T interface port. As shown therein, rather than having a connection for customer interface data to data terminal equipment 22, processor 630 is coupled to an S/T interface 650, which interfaces a 2B+D channel with the U-interface 620 and is coupled to via S/T port to an ISDN terminal equipment, terminal adapter 22A. The D channel is coupled between the processor 630 and the U-interface 620, while the B channel is coupled between the U-interface 620 and the SLI and codec 640.

As will be appreciated from the foregoing description, the need to ensure continuous telephone service to a customer premises served by an ISDN line, without requiring that the customer maintain an additional POTS line as an emergency back-up to the normally used ISDN service, is successfully addressed by a modification of conventional ISDN signalling circuits and network termination interface components, together with an augmentation of the communication control software employed therein, so that, in the event of a loss of power to customer premises equipment, a communication link between an auxiliary POTS telephone and an ISDN communication path to the central office may be established. There need not be any modification of the central office switch, per se, so that the integrity of the ISDN communication path with the central office line card remains unaffected. As a result, the central office equipment can continue to conduct standard ISDN communications with the customer premises equipment, even though the customer is employing a POTS back-up analog phone.

While we have shown and described a plurality of embodiments of the present invention, it is to be understood that the same is not limited thereto but is susceptible to numerous changes and modifications as known to a person skilled in the art. For example, it should be realized that in addition to its use with ISDN switching equipment, such as, but not limited to, the above mentioned an AT&T central office 5ESS switch, a DMS100 switch, manufactured by Northern Telecom, etc. In addition, the transmission equipment may be of various types, such as, but not limited to digital multiplexers, D4 channel banks, SLC 96 cards, SKC 5 units, etc. Consequently, we do not wish to be limited to the details shown and described herein but intend to cover all such changes and modifications as are obvious to one of ordinary skill in the art.

What is claimed:

1. A method of providing auxiliary plain old telephone service (POTS) capability between an auxiliary POTS telephone at a customer premises, and a communication link coupled to a digital communication interface serving digital communication equipment, which is installed at said customer premises and is powered exclusively of said communication link, in the event that said digital communication equipment is unable to provide telephone service, said method comprising the steps of:

(a) decoupling said communication link from a normal digital signaling path through said digital communication interface to said digital communication equipment and, instead, coupling said communication link to an auxiliary digital/analog signaling path, which is operative to convert outgoing analog signals from said auxiliary POTS telephone to digital communication signals for transmission over said communication link, and to convert incoming digital communication signals from said communication link into analog signals for said auxiliary POTS telephone; and (b) coupling said auxiliary POTS telephone to said auxiliary digital/analog signaling path.

2. A method according to claim 1, wherein said event that said digital communication equipment is unable to provide telephone service corresponds to a loss of power for operating said digital communication equipment.

3. A method according to claim 2, wherein step (a) further comprises monitoring status information signals associated with the power status of said digital communication equipment and, in response to said status information signals being indicative of loss of power to said digital communication equipment, decoupling said communication link from said normal digital signalling path and, instead, coupling said communication link to said auxiliary digital/analog signaling path.

4. A method according to claim 1, wherein step (a) further comprises detecting loss of synchronization of digital signals from said digital communication equipment and, in response to detecting said loss of synchronization of digital signals, decoupling said communication link from said normal digital signalling path and, instead, coupling said communication link to said auxiliary digital/analog signaling path.

5. A method according to claim 1, further including the step (c) of monitoring said communication link for a signaling recovery condition representative of the ability of said digital communication equipment to provide normal telephone service and, in response to detecting said signalling recovery condition, decoupling said communication link from said auxiliary digital/analog signaling path, and recoupling said communication link to said normal digital signaling path through said digital communication interface to said digital communication equipment.

6. A method according to claim 5, wherein step (c) comprises monitoring said communication link for a prescribed tone signal and, in response to detecting said prescribed tone signal, decoupling said communication link from said auxiliary digital/analog signaling path, and recoupling said communication link to said normal digital signalling path through said digital communication interface.

7. A method according to claim 5, wherein step (c) comprises decoupling said communication link from said auxiliary digital/analog signaling path, recoupling said communication link to said normal digital signalling path through said digital communication interface, and attempting to reestablish digital communication capability with said digital communication equipment via said communication link.

8. A method according to claim 7, wherein step (c) further comprises, in response to not being able to reestablish digital communication capability with said digital communication equipment at said customer premises via said communication link within a prescribed period of time, recoupling said communication link to said auxiliary digital/analog signaling path, and decoupling said communication link from said normal digital signalling path.

9. A method according to claim 7, wherein step (c) is carried out periodically to determine whether normal telephone service capability has been restored to said digital communication equipment at said customer premises.

10. An apparatus for providing auxiliary plain old telephone service (POTS) capability between an auxiliary POTS telephone at a customer premises, and a communication link coupled to a communication interface serving digital communication equipment, which is installed at said customer premises and is powered exclusively of said communication link, in the event that said digital communication equipment is unable to provide telephone service, comprising:

a digital signaling path through said communication interface between said communication link and said digital communication equipment;

an auxiliary digital/analog signaling path through said communication interface between said communication link and said digital communication equipment, and being operative to convert outgoing analog signals from said auxiliary POTS telephone to digital communication signals for transmission over said communication link, and to convert incoming digital communication signals from said communication link into analog signals for said auxiliary POTS telephone; and a communication path controller, which is operative, in response to said digital communication equipment being unable to provide telephone service, to couple said auxiliary digital/analog signaling path to said communication link and said auxiliary POTS telephone.

11. An apparatus according to claim 10, wherein said communication path controller is operative, in response to a loss of power for operating said digital communication equipment, to couple said auxiliary digital/analog signaling path to said communication link and said auxiliary POTS telephone.

12. An apparatus according to claim 10, wherein said communication path controller is operative, in response to detecting loss of synchronization of digital signals from said digital communications equipment, to decouple said communication link from said normal digital signalling path and, instead, to couple said communication link to said auxiliary digital/analog signaling path.

13. An apparatus according to claim 10, wherein said communication path controller is operative to monitor said communication link for a signaling recovery condition representative of the ability of said digital communications equipment to provide normal telephone service and, in response thereto, to decouple said communication link from said auxiliary digital/analog signaling path, and to recouple said communication link to said normal digital signalling path through said digital communications interface to said digital communications equipment.

14. An apparatus according to claim 10, wherein said auxiliary digital/analog interface contains a codec and a subscriber loop interface circuit, which are controllably connected in circuit between a digital subscriber loop to said customer premises and said communication link to a central office.

15. An apparatus according to claim 10, wherein said communication link comprises an extended distance communication link from a line card for a central office switch, and wherein said auxiliary digital/analog interface and said communication path controller are located at said customer premises.

16. An apparatus according to claim 10, wherein said communication path controller includes a loss of power-responsive circuit, which is normally powered by a power source for operating said digital communication equipment at said customer premises and is operative, in response to a loss of power for said digital communication equipment, to couple said auxiliary POTS telephone to said digital subscriber loop.

17. An apparatus according to claim 16, wherein said communication path controller includes a hybrid unit which integrates said auxiliary POTS telephone with said digital communication equipment, such that said digital communication equipment is normally coupled to said digital subscriber loop, but in response to said loss of power for said digital communication equipment, is operative to couple said auxiliary POTS telephone to said digital subscriber loop.

18. An apparatus according to claim 10, wherein said communication link extends over a local digital subscriber loop from a line card for a central office switch, and wherein said auxiliary digital/analog interface and said communication path controller include circuitry located within a transceiver in said line card.

19. An apparatus according to claim 10, wherein said communication link extends over a local digital subscriber loop from a line card for a central office switch, and said auxiliary digital/analog interface and said communication path controller includes circuitry contained within a transmission equipment transceiver unit in said line card, and wherein a loss of power-responsive circuit is located at said customer premises, and is operative, in response to a loss of power to said digital communication equipment, to couple said auxiliary POTS telephone to said digital subscriber loop.

* * * * *

UNITED STATES PATENT AND TRADEMARK OFFICE
CERTIFICATE OF CORRECTION

PATENT NO. : 6,301,340 B1
DATED : October 9, 2001
INVENTOR(S) : Michael Scott Sansom and Kevin W. Schneider Page 1 of 2

It is certified that error appears in the above-identified patent and that said Letters Patent is hereby corrected as shown below:

Drawings,
FIG. 10, delete "FIG. 10" insert -- new FIG. 10 --

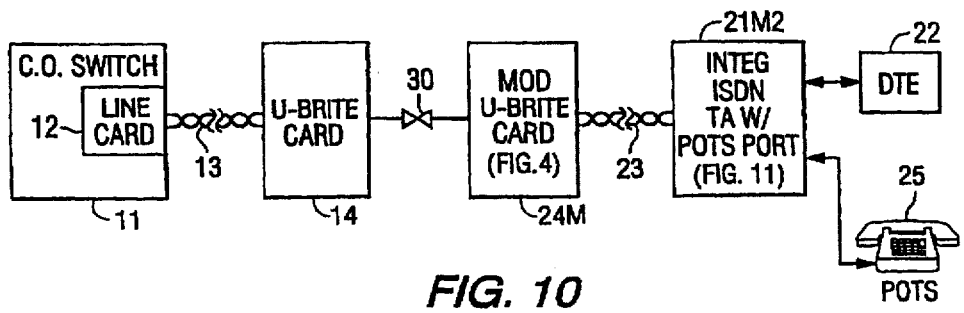

*FIG. 10*

Column 3,
Line 36, delete "of microcontroller" insert -- of a microcontroller --

Column 11,
Line 52, delete "24M" insert -- 21M --

Column 19,
Line 25, delete "24M" insert -- 21M --
Line 35, delete "24M" insert -- 21M --
Line 38, delete "its its" insert -- it is --
Line 45, delete "24M" insert -- 24M --

Column 23,
Line 44, delete "24M2" insert -- 21M2 --
Line 52, delete "24M2" insert -- 21M2 --
Line 65, delete "24M" insert -- 21M --

UNITED STATES PATENT AND TRADEMARK OFFICE
CERTIFICATE OF CORRECTION

PATENT NO. : 6,301,340 B1
DATED : October 9, 2001
INVENTOR(S) : Michael Scott Sansom and Kevin W. Schneider It is certified that error appears in the above-identified patent and that said Letters Patent is hereby corrected as shown below:

<u>Column 24,</u>
Line 21, delete "24M3" insert -- 21M3 --

Signed and Sealed this

Seventh Day of May, 2002

*Attest:*

JAMES E. ROGAN
*Director of the United States Patent and Trademark Office*

*Attesting Officer*